(12) United States Patent
Ohki

(10) Patent No.: US 9,824,429 B2
(45) Date of Patent: Nov. 21, 2017

(54) IMAGE PROCESSING APPARATUS AND METHOD, AND PROGRAM

(71) Applicant: SONY CORPORATION, Tokyo (JP)

(72) Inventor: Mitsuharu Ohki, Tokyo (JP)

(73) Assignee: Sony Corporation, Tokyo (JP)

(*) Notice: Subject to any disclaimer, the term of this patent is extended or adjusted under 35 U.S.C. 154(b) by 571 days.

(21) Appl. No.: 13/960,081

(22) Filed: Aug. 6, 2013

(65) Prior Publication Data
US 2014/0078170 A1 Mar. 20, 2014

(30) Foreign Application Priority Data

Sep. 18, 2012 (JP) ................................. 2012-203963

(51) Int. Cl.
G09G 5/00 (2006.01)
G06T 5/00 (2006.01)
G06T 11/00 (2006.01)

(52) U.S. Cl.
CPC .............. *G06T 5/008* (2013.01); *G06T 5/003* (2013.01); *G06T 11/001* (2013.01); *G06T 2207/10004* (2013.01); *G06T 2207/20192* (2013.01)

(58) Field of Classification Search
CPC ...... G06T 3/4007; G06T 15/80; G06T 11/001
USPC ........ 345/581, 606, 619; 382/162, 168, 171, 382/173, 254, 274
See application file for complete search history.

(56) References Cited

U.S. PATENT DOCUMENTS

2008/0024725 A1* 1/2008 Todd .............................. 351/222
2011/0043537 A1* 2/2011 Dellon et al. ................. 345/647
2013/0250246 A1* 9/2013 Shapiro ......................... 351/246

FOREIGN PATENT DOCUMENTS

JP 05-314273 11/1993

OTHER PUBLICATIONS

Kitaoka, Akiyoshi, "Configurational Coincidence Among Six Phenomena: A Comment on van Lier and Csatho", Perception, 2006, vol. 35, pp. 799-806.*
Anstis, Stuart, "Factors Affecting Footsteps: Contrast Can Change the Apparent Speed, Amplitude and Direction of Motion", Vision Research 44, No. 18 (2004): pp. 2171-2178.*
Ming-Te Chi, et al., Self-Animating Images: Illusory Motion Using Repeated Asymmetric Patterns, ACM Transactions on Graphics, Aug. 2008, vol. 27, No. 3, Article 62, ACM, Inc., New York, New York, United States of America.

* cited by examiner

*Primary Examiner* — Xiao Wu
*Assistant Examiner* — Sarah Lhymn
(74) *Attorney, Agent, or Firm* — Paratus Law Group, PLLC

(57) ABSTRACT

There is provided an image processing apparatus including an edge detection part that detects an edge of a subject on an input image, a luminance change determination part that determines whether a luminance value in a vicinity of the edge in the input image is increased or decreased in a predetermined direction, and a contour supplement part that supplements a contour to the edge in the input image, the contour having the luminance value changed in a time direction depending on a result of the determination.

9 Claims, 21 Drawing Sheets

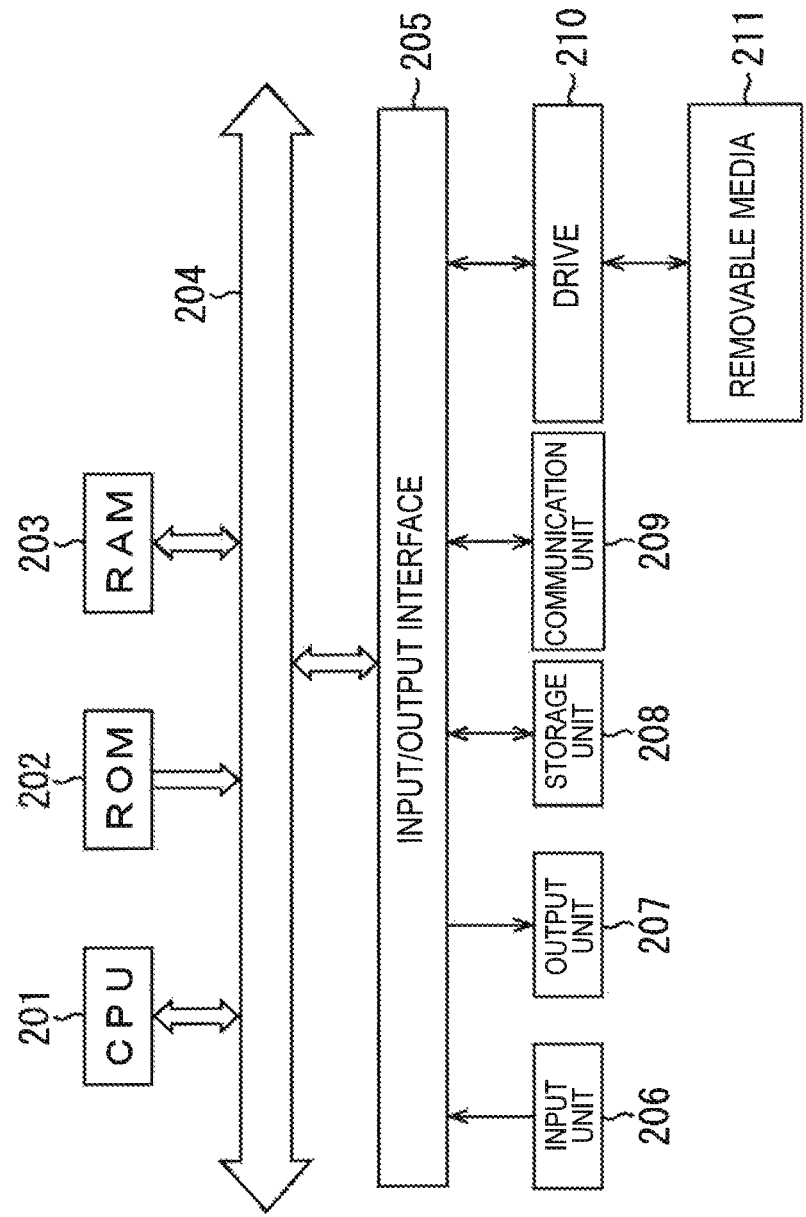

IMAGE PROCESSING APPARATUS AND METHOD, AND PROGRAM

BACKGROUND

The present technology relates to an image processing apparatus and method, and a program, and particularly to an image processing apparatus and method, and a program in which a subject on an image is viewed as the subject as it is while a motion of the subject is made to be able to be perceived by a viewer.

In the past, an image processing for expressing a motion using illusion was known (for example, refer to Ming-Te Chi, et. al. "Self-Animating Images: Illusory Motion Using Repeated Asymmetric Patterns" ACM Transaction on Graphics (Proceedings of SIGGRAPH 2008), 27, No. 3). The document by Ming-Te Chi, et. al. discloses a technique in which an input image such as a painting is analyzed to find a flow direction of an edge and patterns are created such that an Optimized Fraser-Wilcox Illusion occurs in that direction for a viewer.

Additionally, there has been proposed a technology as a technology for emphasizing a subject on an image in which an edge on the image is detected and contour data is added to the detected edge (For example, refer to Japanese Patent Laid-Open No. 05-314273).

SUMMARY

However, the above mentioned technology has had a difficulty in that a subject such as a scenery in an image photographed by a person is viewed by a viewer as a subject as it is while a motion of the subject in the image photographed by the person is perceived by the viewer using illusion.

For example, in the technology disclosed in the document by Ming-Te Chi, et. al., an output image obtained by processing an input image may be an image having such patterns that are so far apart from the input image. Therefore, if the technology in the document by Ming-Te Chi, et. al. is applied to an image obtained by photographing a subject, an output image to be obtained may be inadequate as an image for viewing the subject such as a landscape photographed by a person as it is.

In view of the circumstances described above, it is desirable that a subject on an image is viewed as the subject as it is while a motion of the subject is made to be able to be perceived by a viewer.

According to an embodiment of the present technology, there is provided an image processing apparatus including an edge detection part that detects an edge of a subject on an input image, a luminance change determination part that determines whether a luminance value in a vicinity of the edge in the input image is increased or decreased in a predetermined direction, and a contour supplement part that supplements a contour to the edge in the input image, the contour having the luminance value changed in a time direction depending on a result of the determination.

The predetermined direction may be orthogonal to the edge.

The contour supplement part may define the luminance value of the contour such that the luminance value of the contour is increased or decreased from a predetermined luminance value in a first period and the luminance value of a contour may be returned to the predetermined luminance value in a second period longer than the first period.

The luminance change determination part may determine change in the luminance value in the vicinity of the edge toward the predetermined direction for the edge within a first region on the input image, and determines change in the luminance value in the vicinity of the edge toward a direction opposite to the predetermined direction for the edge within a second region other than the first region on the input image.

The contour supplement part may define the luminance value of the contour such that the first period for the contour supplemented to the edge within the first region is to be different in a time from the first period for the contour supplemented to the edge within the second region.

The image processing apparatus may further include an effect line adding part that adds an effect line to a region on a side opposite to the predetermined direction at the edge in the input image.

The effect line adding part may add the effect line to the edge, the effect line having a pattern changed in the luminance value toward a direction opposite to the predetermined direction, and the pattern travelling to the opposite direction with time.

According to an embodiment of the present technology, there is provided a image processing method including detecting an edge of a subject on an input image, determining whether a luminance value in a vicinity of the edge in the input image is increased or decreased in a predetermined direction, and supplementing a contour to the edge in the input image, the contour having the luminance value changed in a time direction depending on a result of the determination.

According to an embodiment of the present technology, there is provided a program causing a computer to execute a process, the process including detecting an edge of a subject on an input image, determining whether a luminance value in a vicinity of the edge in the input image is increased or decreased in a predetermined direction, and supplementing a contour to the edge in the input image, the contour having the luminance value changed in a time direction depending on a result of the determination.

According to an embodiment of the present technology, a subject on an image is viewed as a subject as it is while a motion of the subject is made to be able to be perceived by a viewer.

BRIEF DESCRIPTION OF THE DRAWINGS

FIG. 24 shows a configuration example of a computer.

DETAILED DESCRIPTION OF THE EMBODIMENT(S)

Figure 1:
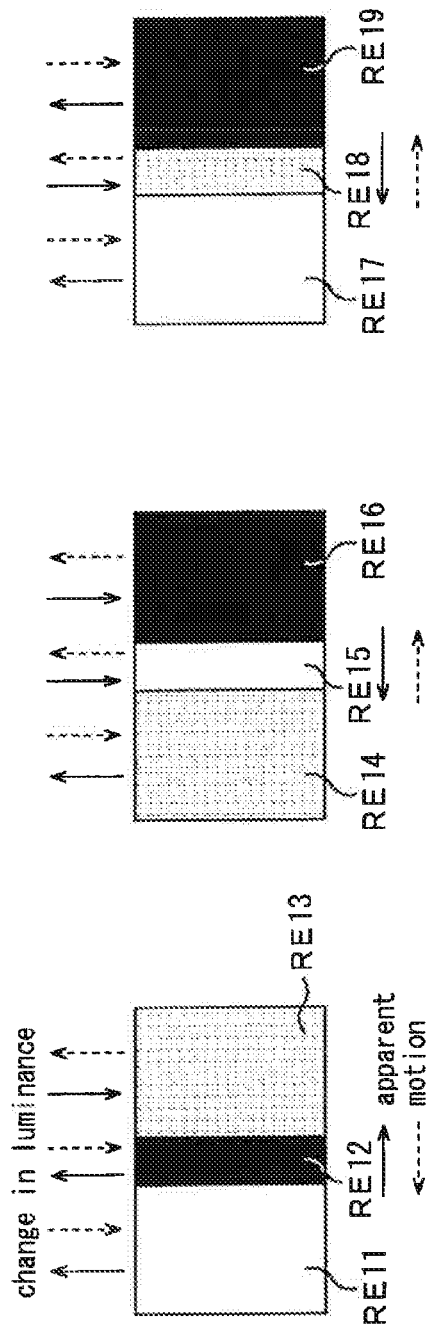
FIG. 1 illustrates an illusion effect.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, a description will be given of an embodiment to which the present technology is applied with reference to the drawings.

First Embodiment

[Illusion Effect]

Firstly, a movement illusion effect (motion illusion) utilized in the present technology is described.

For example, A. Kitaoka, "Configurational coincidence among six phenomena: A comment on van Lier and Csatho (2006)," Perception, 35, pp. 799-806., discloses that a luminance of each region is changed to make a region in the vicinity of each region to be perceived as if the region might move.

Specifically, as shown in FIG. 1 on the left hand side, assuming that a user (viewer) is observing an image composed of strip-shaped regions RE11 to RE13 each having a single luminance value. Here, in FIG. 1, vertical arrows of solid and broken lines drawn on the upper hand side of the respective regions in the figure depict changes in the luminance values of the corresponding regions. Horizontal arrows of solid and broken lines depict directions of motions of the corresponding regions which are caused by an illusion effect produced due to a luminance change depicted by the vertical arrow. That is, the solid horizontal arrow depicts the direction of the motion due to the luminance change corresponding to the solid vertical arrow, and the broken horizontal arrow depicts the direction of the motion due to the luminance change corresponding to the broken vertical arrow.

Here, each of the regions RE11 to RE13 is a region composed of pixels having the same luminance value, and is different in brightness from one another. In this example, the region RE11 is the brightest region, the region RE12 is the darkest region. Moreover, the region RE13 is a region having a middle brightness (luminance) between those of the region RE11 and the region RE12.

From such a state, as the luminance value of the region RE11 is changed to further brighten the region with time, the user perceives as if the center region RE12 might move rightward.

In contrast, from the state shown in the figure on the left hand side, as the luminance value of the region RE11 is changed to darken the region with time, the user perceives as if the center region RE12 might move leftward.

Moreover, from the state shown in the figure on the left hand side, as the luminance value of the region RE12 is changed to brighten the region with time, the user perceives as if the center region RE12 might move rightward. In contrast, from the state in the figure on the left hand side, as the luminance value of the region RE12 is changed to darken the region with time, the user perceives as if the center region RE12 might move leftward.

Additionally, from the state shown in the figure on the left hand side, as the luminance value of the region RE13 is changed to darken the region with time, the user perceives as if the center region RE12 might move rightward. In contrast, from the state shown in the figure on the left hand side, as the luminance value of the region RE13 is changed to brighten the region with time, the user perceives as if the center region RE12 might move leftward.

Similarly, as shown in the figure at the center, assuming that the user is observing an image composed of strip-shaped regions RE14 to RE16 each having a single luminance value. Here, the region RE15 is the brightest region, the region RE16 is the darkest region, and the region RE14 is a region having a middle brightness (luminance) between those of the region RE15 and the region RE16.

From this state, as the luminance value of the region RE14 is changed to brighten the region with time, the user perceives as if the center region RE15 might move leftward, and as the luminance value of the region RE14 is changed to darken the region with time, the user perceives as if the center region RE15 might move rightward.

Moreover, from the state shown in the figure at the center, as the luminance value of the region RE15 is changed to darken the region with time, the user perceives as if the region RE15 might move leftward, and as the luminance value of the region RE15 is changed to brighten the region with time, the user perceives as if the region RE15 might move rightward.

Further, from the state shown in the figure at the center, the luminance value of the region RE16 is changed to darken the region with time, the user perceives as if the region RE15 might move leftward, and as the luminance value of the region RE16 is changed to brighten the region with time, the user perceives as if the region RE15 might move rightward.

Furthermore, as shown in the figure on the right hand side, assuming that the user is observing an image composed of strip-shaped regions RE17 to RE19 each having a single luminance value. Here, the region RE17 is the brightest region, the region RE19 is the darkest region, and the region RE18 is a region having a middle brightness (luminance) between those of the region RE17 and the region RE19.

From this state, as the luminance value of the region RE17 is changed to brighten the region with time, the user perceives as if the center region RE18 might move leftward, and as the luminance value of the region RE17 is changed to darken the region with time, the user perceives as if the region RE18 might move rightward.

Moreover, from the state shown in the figure on the right hand side, as luminance value of the region RE18 is changed to darken the region with time, the user perceives as if the region RE18 might move leftward, and as the luminance value of the region RE18 is changed to brighten the region with time, the user perceives as if the region RE18 might move rightward.

Further, from the state shown in the figure on the right hand side, as the luminance value of the region RE19 is changed to brighten the region with time, the user perceives as if the region RE18 might move leftward, and as luminance value of the region RE19 is changed to darken the region with time, the user perceives as if the region RE18 might move rightward.

[Present Technology]

The description of the present technology will be given below on the basis of the phenomenon described with reference to FIG. 1.

In the present technology, the phenomenon described with reference to FIG. 1 is applied to an edge portion of an input image such as a general scenery picture so as to induce a sensory illusion as if the subject in the input image might be moving. As can be seen from the description in FIG. 1, the study concerning the illusion known in the relate art has been limited to the issue of perception of how, with respect not to an image obtained by photographing a general scenery picture but to an image composed of patterns, the patterns might move when the luminance values of the patterns are changed.

The present technology applies this phenomenon to the edge portion of an input image such as a general scenery picture to generate an illusory motion of the subject, which is a novel matter not found in the related art.

In terms of the image processing, the primary processes in the present technology are as follows.

Process (1)

In the input image, accepted is a designation for a region of a subject (object) intended to be moved and a direction in which the subject is intended to be moved. Here, hereinafter, a region of a subject intended to be moved is also referred to as a motion-intended subject region, and a direction in which the motion-intended subject region is intended to be moved is also referred to as a moving direction.

Process (2)

In the input image, an edge orthogonal to the direction in which the subject is intended to be moved, that is, orthogonal to the moving direction of the motion-intended subject region is detected within the motion-intended subject region.

Process (3)

Change in a luminance value of a region in the vicinity of the edge detected in the process (2) is examined along the moving direction.

Process (4-1)

In a case where the change in the luminance value identified in the process (3) is a change that the luminance value is decreased along the moving direction, a black strip-shaped contour is added (supplemented) on an edge within the motion-intended subject region, and luminance of this contour is raised with time.

Process (4-2)

In a case where the change in the luminance value identified in the process (3) is a change that the luminance value is increased along the moving direction, a white strip-shaped contour is added (supplemented) on an edge within the motion-intended subject region, and luminance of this contour is reduced with time.

The above processes (1) to (4-2) make it possible for a viewer to perceive as if the motion-intended subject region is moving in the moving direction.

Figure 2:
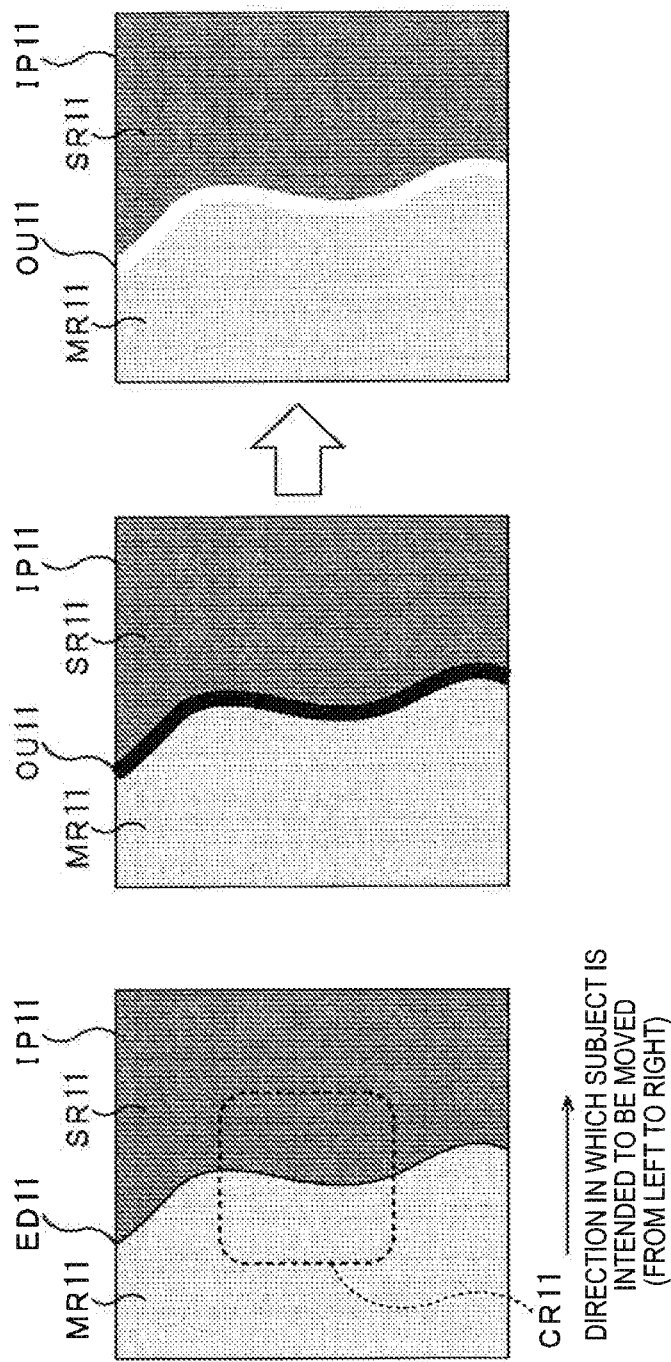
FIG. 2 illustrates an illusion produced by overlapping a contour on an edge portion.

For example, as shown in FIG. 2 on the left hand side, assuming that a region in the left side in a figure of an input image IP11 to be processed is designated as a motion-intended subject region MR11 that is the region of the subject intended to be moved, and the rightward direction in the figure is designated as a direction in which the motion-intended subject region MR11 is intended to be moved.

In this example, the input image IP11 includes the motion-intended subject region MR11 and a region SR11 which is not designated as the motion-intended subject region.

In the input image IP11 as described above, when the process (1) designates the motion-intended subject region MR11 and the moving direction, the process (2) detects an edge orthogonal to the designated moving direction within the motion-intended subject region MR11. Here, a contour portion to the right of the motion-intended subject region MR11 is detected as an edge ED11.

Furthermore, the process (3) examines how the luminance value of each pixel is changed along the rightward direction as the moving direction in a region CR11 in the vicinity of the edge ED11. In this example, the luminance value of the pixel is decreased toward the rightward direction in the figure in the region CR11. That is, the pixel is relatively darker toward the moving direction.

For this reason, following the process (3), the process (4-1) is performed. Specifically, as shown in the figure at the center, a black strip-shaped contour OU11 is supplemented on the edge ED11. Here, the luminance value of the contour OU11 is not limited to the possible minimum value as the luminance value but may be, for example, a luminance value lower than the average luminance value of the region SR11.

Moreover, as shown in the figure on the right hand side, brightness of the contour OU11 is controlled such that the luminance value of the contour OU11 supplemented with respect to the motion-intended subject region MR11 is increased with time. This generates an illusion and makes the motion-intended subject region MR11 to be perceived as if the region might be moving toward the rightward direction. This may be apparent by considering the case where the motion-intended subject region MR11, the contour OU11 and the region SR11 are corresponded to, for example, the regions RE11 to RE13 in FIG. 1, respectively, and the luminance of the region RE12 is increased. Since the contour portion of the motion-intended subject region is perceived as if to be moving, the motion-intended subject region itself should be perceived as if to be moving.

Figure 3:
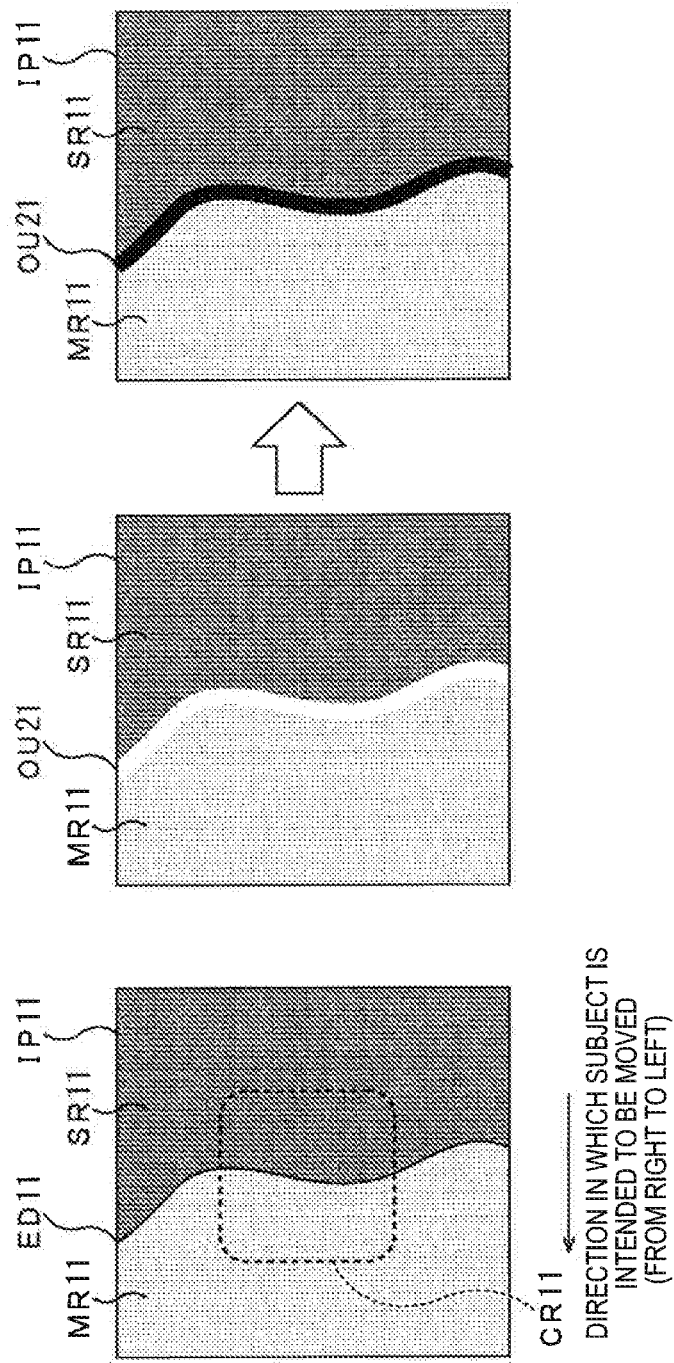
FIG. 3 illustrates an illusion produced by overlapping a contour on an edge portion.

Additionally, for example, as shown in FIG. 3 on the left hand side, assuming that the region in the left hand side in the figure of the input image IP11 to be processed is designated as the motion-intended subject region MR11, and the leftward direction in the figure is designated as the direction in which the motion-intended subject region MR11 is intended to be moved. Here, the elements in FIG. 3 corresponding to those in FIG. 2 are denoted by the same signs, and the description thereof is omitted.

In this example, when the process (1) designates the motion-intended subject region MR11 and the leftward direction as the moving direction, the process (2) detects the edge ED11. Then, the process (3) examines how the luminance value of each pixel is changed along the leftward direction as the moving direction in a region CR11 in the vicinity of the edge ED11. In this example, the luminance value of the pixel is increased toward the leftward direction in the figure in the region CR11. That is, the pixel is relatively brighter toward the moving direction.

For this reason, following the process (3), the process (4-2) is performed. Specifically, as shown in the figure at the center, a white strip-shaped contour OU21 is supplemented on the edge ED11. Here, the luminance value of the contour OU21 is not limited to the possible maximum value as the luminance value but may be, for example, a luminance value higher than the average luminance value of the motion-intended subject region MR11.

Moreover, as shown in the figure on the right hand side, brightness of the contour OU21 is controlled such that the luminance value of the contour OU21 supplemented with respect to the motion-intended subject region MR11 is decreased with time. This generates an illusion and makes the motion-intended subject region MR11 to be perceived as if the region might move toward the leftward direction. This may be apparent by considering the case where the motion-intended subject region MR11, the contour OU21 and the region SR11 are corresponded to, for example, the regions RE14 to RE16 in FIG. 1, respectively, and the luminance of the region RE15 is decreased.

Here, a duration for transition from the state shown in FIG. 2 at the center to the state shown in FIG. 2 on the right hand side, or from the state shown in FIG. 3 at the center to the state shown in FIG. 3 on the right hand side, that is, a duration for changing the luminance of the contour supplemented to the motion-intended subject region is preferably about 0.25 second. That is, the present applicant has confirmed by an experiment that if transition is performed taking about 0.25 second, the illusion is remarkably generated.

As described above, if the input image IP11 is changed taking 0.25 second from the state shown in FIG. 2 at the center or the state shown in FIG. 3 at the center to the state shown in FIG. 2 on the right hand side or the state shown in FIG. 3 on the right hand side, the illusion is generated as if the motion-intended subject region MR11 might move in the moving direction.

However, in such a state transition, the presented input image IP11 may be only a transient moving image having 0.25 second duration. That is, when the input image IP11 becomes the state shown in FIG. 2 on the right hand side or the state shown in FIG. 3 on the right hand side, a state of the illusion in the input image IP11 is over. This leads to that the user (viewer) can only view the motion of the subject on the input image IP11 for mere 0.25 second.

Figure 4:
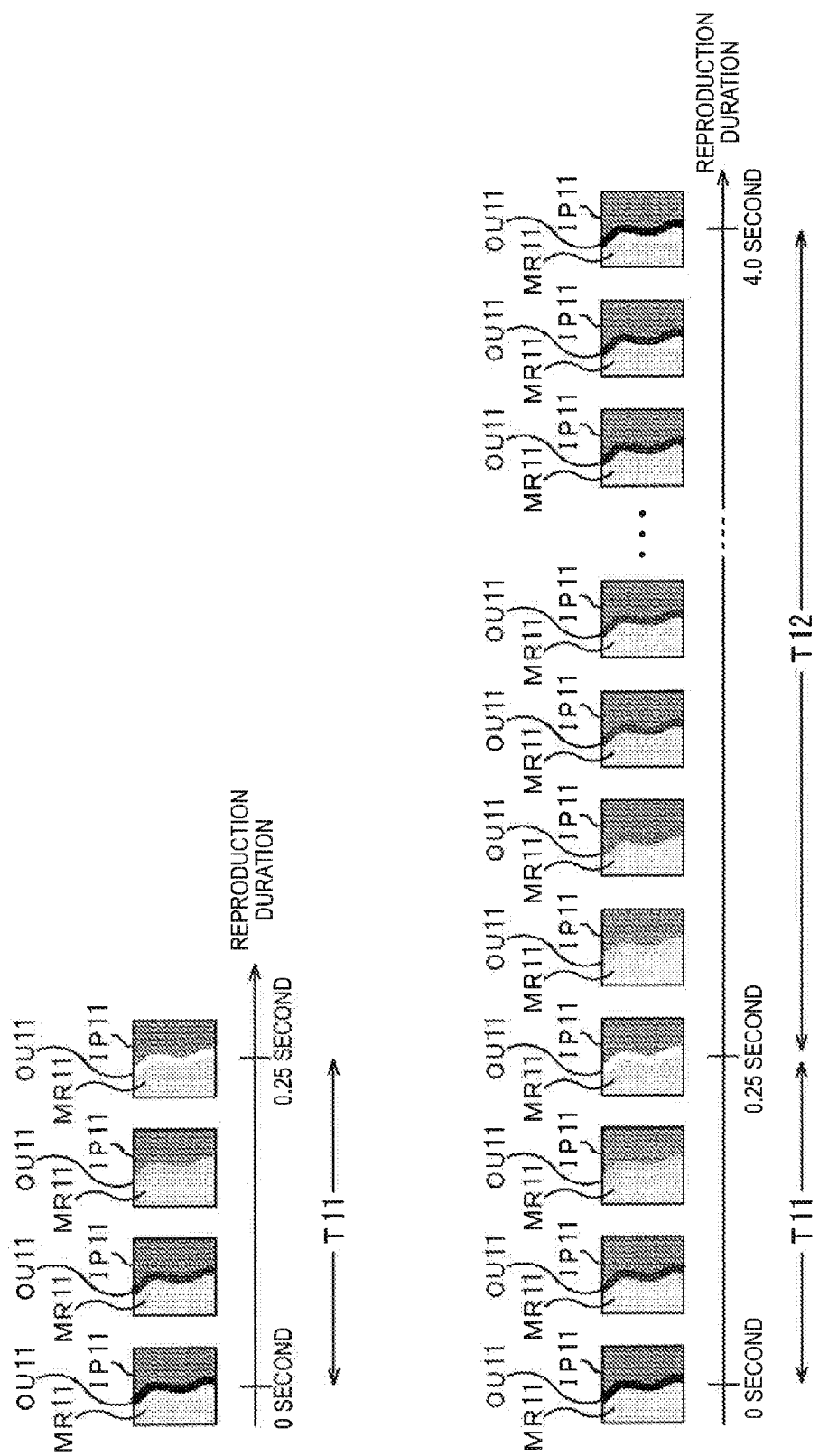
FIG. 4 illustrates an illusion produced by overlapping a contour on an edge portion.

Specifically, for example, as shown in FIG. 4 at the upper hand side, assuming that the input image IP11 shown in FIG. 2 at the center is displayed at a time at 0 second in a reproduction duration, and thereafter, the luminance value of the contour OU11 supplemented to the input image IP11 is changed to brighten the contour taking 0.25 second such that the input image IP11 becomes the state shown in FIG. 2 on the right hand side. Here, the elements in FIG. 4 corresponding to those in FIG. 2 are denoted by the same signs, and the description thereof is omitted. In addition, a horizontal direction in FIG. 4 represents time.

In the example shown in FIG. 4 on the upper hand side, the display of the input image IP11 is controlled such that the luminance value of the contour OU11 is changed to brighten the contour with time for a duration T11 from 0 second to 0.25 second in the reproduction duration. For this duration T11, the illusion is generated as if the motion-intended subject region MR11 might be moving from left to right, but, at 0.25 second later from the reproduction (display) of the input image IP11 the reproduction may stop.

Therefore, the present technology adds processes as follows such that the input image IP11 can be reproduced as an endless moving image (loop moving image).

That is, as show in FIG. 4 on the lower hand side, the luminance value of the contour OU11 supplemented to the edge portion is increased with time taking 0.25 second for the duration T11 from 0 second to 0.25 second in the reproduction duration similar to the case described above. For example, the contour OU11 is changed from the black region to the white region.

Then, after that, the luminance value of the contour OU11 is decreased with time taking 3.75 seconds. For example, the contour OU11 changes from the white region to the black region. In the example shown in FIG. 4 on the lower hand side, for a duration T12 from 0.25 second to 4.0 second in the reproduction duration, the luminance value of the contour OU11 is decreased such that the luminance value of the contour OU11 may return to the luminance value of the contour OU11 at the time at 0 second in the reproduction duration.

The performing the processes above allows that the input image IP11 at 0 second in reproduction duration, that is, at a start time of the duration T11 is the same as the input image IP11 at 4.0 second in the reproduction duration, that is, at an end time of the duration T12. Accordingly, if the input image IP11 for four seconds including the duration T11 and the duration T12 is repeatedly reproduced, the images presented at 4 second and at 0 second are linked to each other without any discomfort, and the input image IP11 can be reproduced as the endless moving image.

In this example, the user may perceive the illusion that the motion-intended subject region MR11 might be moving from left to right for the duration T11 from 0 second to 0.25 second.

Then, for the subsequent duration T12 from 0.25 second to 4 second, since the luminance value of the contour OU11 of the edge portion is decreased with time, a change occurs similar to the change from the input image IP11 shown in FIG. 3 at the center to the input image IP11 shown in FIG. 3 on the right hand side.

However, in the example shown in FIG. 4, the luminance of the contour OU11 is changed slowly taking a long period time of 3.75 seconds from the state at the start time of the duration T12 in the input image IP11 to the state at the end time of the duration T12. For this reason, the user observing the input image IP11 does not notice the change in the luminance of the contour OU11 and the user does not perceive the illusion as if the motion-intended subject region MR11 might be moving from right to left as the example shown in FIG. 3. That is, the illusion does not occur for the duration T12.

As described above, in the example shown in FIG. 4 on the lower hand side, the illusion is perceived as if the motion-intended subject region MR11 might be moving from left to right for the duration from 0 second to 0.25 second, and the motion-intended subject region MR11 is perceived to remain still for the duration from 0.25 second to 4 second. The repeated reproductions of the four seconds moving image like this allows that the user may perceive the illusion that the motion-intended subject region might move or stop, and the moving direction of the motion-intended subject region is a left-to-right direction in the figure.

In the above description, the transition of a luminance state of the contour taking about 0.25 second generates remarkably the illusion. However, besides this fact, it is also confirmed in an experiment by the present applicant that if the luminance state of the contour is transited taking about 3.75 seconds, because of the slow transition, the observer does not notice the change thereof and the illusion does not occur.

In the example shown in FIG. 3 also, the endless moving image in which the motion-intended subject region might move or stop can be obtained by performing the processes similar to those shown in FIG. 4. Hereinafter, such an endless moving image is also referred to as an output moving image, and images at respective times constituting the output moving image, in other words, one image presented at each time is also referred to as an output image. That is to say, a group composed of the output images at the respective times is the output moving image.

Additionally, for the purpose of easy understanding of the description in the above, the description is given assuming that the duration T11 for generating the illusion is set to 0.25 second, and the duration T12 for changing the luminance value to the initial value is set to 3.75 seconds. However, those durations in the present technology are not limited to 0.25 second or 3.75 seconds. Also, for the purpose of easy understanding of the description below, the description will be given assuming that the duration for generating the illusion is set to 0.25 second and the duration for changing the luminance value to the initial value is set to 3.75 seconds.

[Configuration Example of Information Processing Apparatus]

Next, a specific embodiment applied with the present technology will be described.

Figure 5:
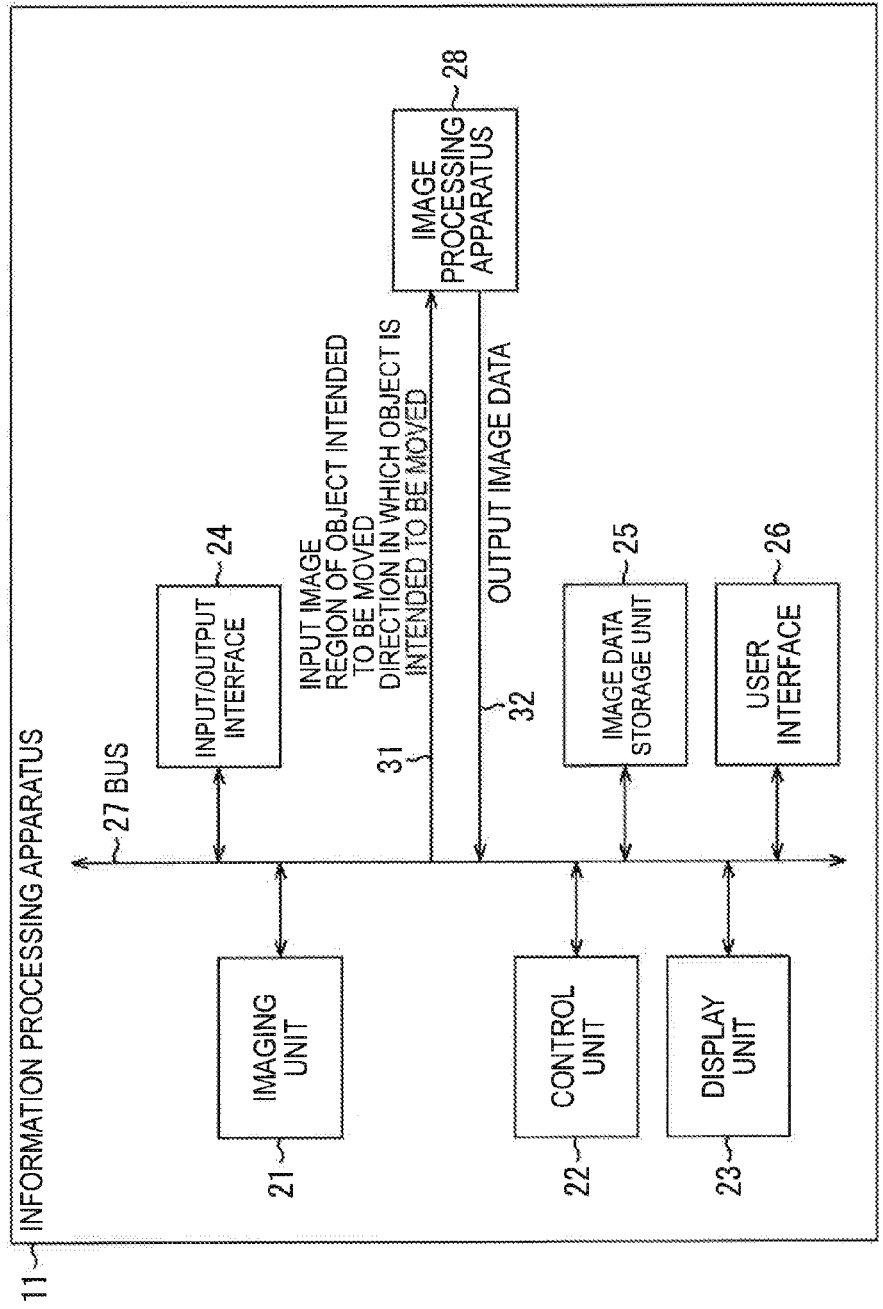
FIG. 5 shows a configuration example of an information processing apparatus.

FIG. 5 shows a configuration example of an embodiment of an information processing apparatus to which the present technology is applied.

An information processing apparatus 11 in FIG. 5 is an apparatus for shooting an image or performing a variety of information processing such as an image processing for image data obtained by shooting.

The information processing apparatus 11 includes an imaging unit 21, a control unit 22, a display unit 23, an input/output interface 24, an image data storage unit 25, a user interface 26, a bus 27, and an image processing apparatus 28.

The imaging unit 21, user interface 26 and image processing apparatus 28 are coupled with one another via the bus 27, and particularly the image processing apparatus 28 is coupled via a signal line 31 and a signal line 32 with the bus 27.

The imaging unit 21 shoots a subject such as a moving object to generate image data. The image data obtained by shooting is supplied, for example, from the imaging unit 21 via the bus 27 to the image data storage unit 25 and stored.

The control unit 22 controls a whole operation of the information processing apparatus 11. For example, the control unit 22 receives an instruction for shooting an input image from the user via the user interface 26 to cause the imaging unit 21 to shoot an input image according to the instruction, or causes the image processing apparatus 28 to perform the image processing for the image data.

The display unit 23 displays an image based on the image data supplied via the bus 27. The input/output interface 24 outputs data to an apparatus external to the information processing apparatus 11 and inputs data from an external apparatus to the apparatus 11. For example, the input/output interface 24 sends and receives a variety of data including the image data to and from the external apparatus.

The image data storage unit 25 stores the image data supplied via the bus 27. The user interface 26 receives an instruction from the user to supply a signal corresponding to the instruction via the bus 27 to the control unit 22 and the like. The bus 27 is a common path for the imaging unit 21, user interface 26 and image processing apparatus 28 to send and receive the data.

The image processing apparatus 28 performs a predetermined image processing on the image data supplied from the image data storage unit 25.

For example, the image processing apparatus 28 reads the image data of the input image (hereinafter, referred to as input image data) from the image data storage unit 25 via the signal line 31 and the bus 27. Further, when the user designates the motion-intended subject region and moving direction in the input image via the user interface 26, a signal corresponding to the user's operation is supplied from the user interface 26 via the bus 27 and the signal line 31 to the image processing apparatus 28.

The image processing apparatus 28 subjects the input image data to the image processing on the basis of information indicating the motion-intended subject region and the moving direction supplied from the user interface 26, and generates, for example, the image data for four seconds described with reference to FIG. 4 as the output image data of the output moving image. Then, the image processing apparatus 28 outputs the obtained output image data via the signal line 32 and the bus 27 to the display unit 23 and the like.

[Configuration Example of Image Processing Apparatus]

Figure 6:
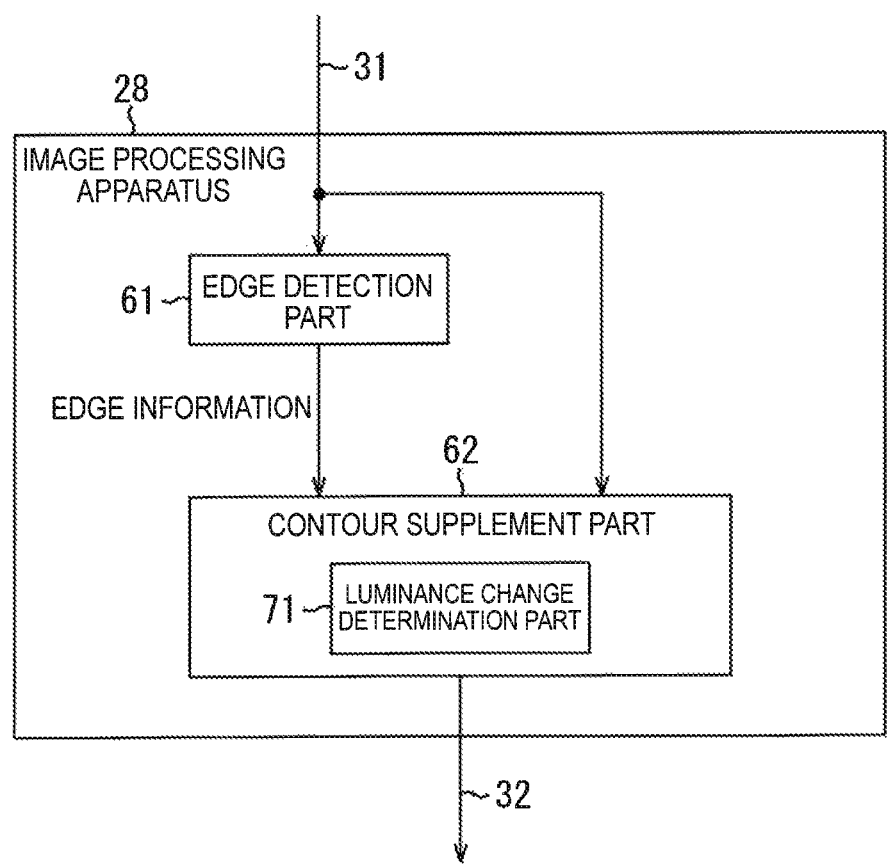
FIG. 6 shows a configuration example of an image processing apparatus.

The image processing apparatus 28 shown in FIG. 5 is configured in detail as is shown in FIG. 6. That is, the image processing apparatus 28 shown in FIG. 6 is constituted by an edge detection part 61 and a contour supplement part 62.

The edge detection part 61 detects an edge orthogonal to the moving direction from the input image supplied via the signal line 31 on the basis of the information indicating the motion-intended subject region and the moving direction (hereinafter, also referred to as designation information) supplied from the user interface 26 via the signal line 31. The edge detection part 61 supplies information concerning the edge obtained by the edge detection to the contour supplement part 62 as edge information. A process performed by the edge detection part 61 corresponds to the process (2) described above.

The contour supplement part 62 generates the output image data on the basis of the edge information from the edge detection part 61 and the designation information and image data of the input image supplied via the signal line 31, and displays the output image data via the signal line 32 in the display unit 23 and the like.

The contour supplement part 62 includes a luminance change determination part 71. The luminance change determination part 71 determines, regarding each edge indicated by the edge information, whether the luminance value of each pixel (position) in the vicinity of the edge is increased or decreased along the moving direction. The contour supplement part 62, on the basis of a determination result by the luminance change determination part 71, overlaps the contour having the luminance value depending on the determination result on the edge portion of the input image to obtain the output image, generating the output moving image. The output moving image obtained in this way is, for example, data having four seconds reproduction duration.

[Description of Image Generation Process]

As described above, when the user operates the user interface 26 to designate the region of the subject intended to be moved on the input image as the motion-intended subject region, and the direction in which the motion-intended subject region is intended to be moved as the moving direction, the designation information indicating the motion-intended subject region and the moving direction is supplied to the image processing apparatus 28. Besides the designation information, when the image processing apparatus 28 is supplied with the input image data from the image data storage unit 25, the image processing apparatus 28 performs the image generation process to generate the output image data. The following description describes the image generation process performed by the image processing apparatus 28 with reference to a flow chart in FIG. 7.

At step S11, the edge detection part 61 detects an edge orthogonal to the moving direction of the motion-intended subject region from the motion-intended subject region on the input image which is supplied from the image data storage unit 25 on the basis of the designation information supplied from the user interface 26.

For example, the edge detection part 61 detects an edge orthogonal to the moving direction from inside the motion-intended subject region indicated by the designation information using a convolution operation between the input image and Gabor filter. In Gabor filter an angle is given as a parameter, and as this angle, an angle is set which is the same as an angle of the direction in which the motion-intended subject region is intended to be moved, that is, the moving direction. This allows the edge orthogonal to the moving direction to be detected.

The edge detection part 61 sets information indicating each detected edge as the edge information to supply the edge information to the contour supplement part 62.

At step S12, the contour supplement part 62 takes the input image supplied from the image data storage unit 25 as an output image at each time for constituting the output moving image about to be generated.

For example, assuming that the output moving image having the reproduction duration of four seconds is about to be generated, and the output image at each reproduction time is D(t). Here, t represents time, and 0.0≤t≤4.0. At this time, the contour supplement part 62 sets the respective input images without no change as the output images D(t) at the respective times, the output images being as many as the number of images for four seconds. Note that the output images D(t) set here are temporary output images, and are processed in the subsequent processes to be final output images.

At step S13, the contour supplement part 62, on the basis of the edge information supplied from the edge detection part 61, selects one unprocessed edge from the edges detected within the motion-intended subject region on the input image, and sets the selected edge as a target edge.

At step S14, the luminance change determination part 71 identifies, in a region in the vicinity of the target edge on the input image, the change in the luminance value of each pixel toward the moving direction indicated by the designation information. That is, the luminance change determination part 71 identifies whether the luminance value of the pixel in the region in the vicinity of the target edge is decreased or increased along the moving direction.

Specifically, for example, the luminance change determination part 71, regarding the pixels in the vicinity of the target edge which align along the moving direction, compares an average of the luminance values of the respective pixels located on a motion destination side with respect to the target edge with an average of the luminance values of the respective pixels located on a motion source side with respect to the target edge to identify the luminance change in the pixel. At this time, in the case where the average of the luminance values of the pixels in the region on the motion destination side in the moving direction with respect to the target edge is larger than the average of the luminance values of the pixels in the region on the motion source side in the moving direction with respect to the target edge, the luminance value is determined to become increased.

At step S15, the luminance change determination part 71, on the basis of the identified result by the process at step S14, determines whether or not the luminance value of the pixel is being decreased along the moving direction in the vicinity of the target edge.

If determined the luminance value is being decreased at step S15, the process proceeds to step S16.

At step S16, the contour supplement part 62 overlaps the contour having a predetermined luminance on a target edge portion in the output image of each time such that the luminance of the target edge portion in the output image, which has increased toward a time direction, may return to the initial luminance For example, the contour supplement part 62, regarding the output image D(t) at a predetermined time t (0.0≤t≤4.0), defines a luminance value L(t) of the contour. Specifically, the luminance value L(t) is, for example, a luminance value defined by a polygonal line LM11 shown in FIG. 8. Here, in FIG. 8 an abscissa axis represents a time and an ordinate axis represents a luminance value.

In this example, the possible maximum value and possible minimum value as the luminance value of the pixel on the image are defined as a maximum luminance value $L_{max}$ and a minimum luminance value $L_{min}$, respectively. For example, the maximum luminance value $L_{max}$ is a luminance for the white region and the minimum luminance value $L_{min}$ is a luminance for the black region.

Figure 8:
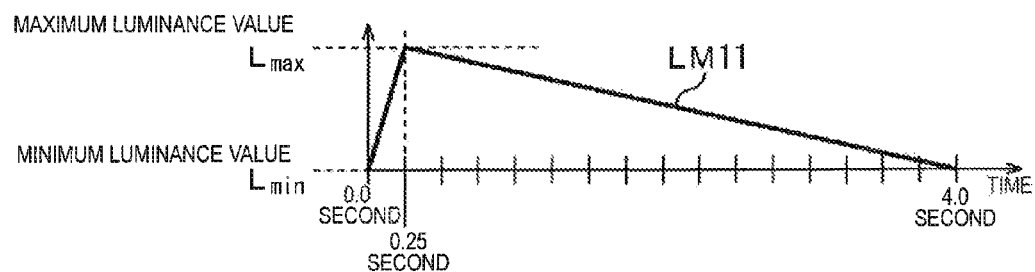
FIG. 8 shows an example of a temporal change in a luminance value of a contour.

In FIG. 8, the luminance value L(t) of a contour region is found at the time t=0.0 as the luminance value $L(t)=L_{min}$, and thereafter, is linearly raised as the time t is increased, and then the luminance value $L(t)=L_{max}$ at the time t=0.25. After that, the luminance value L(t) of the contour region is linearly dropped as the time t is increased, and found at the time t=4.0 as the luminance value $L(t)=L_{min}$. In this way, the luminance value at the time t indicated by the polygonal line LM11 is defined as the luminance value L(t) of the contour region at that time t.

The contour supplement part 62 after defining the luminance value L(t) at the time t, overlaps a contour composed of pixels having the luminance value L(t) on a target edge region within the motion-intended subject region of the output image D(t). That is, the luminance value of the pixel in the target edge region within the motion-intended subject region of the output image D(t) is changed from the current luminance value to the luminance value L(t).

This allows that when the moving image composed of the output images D(t) at the respective times is reproduced, the luminance value of the target edge portion in the output image is changed as shown in FIG. 8 by the polygonal line LM11.

That is, the contour supplement part 62 increases the luminance value of the target edge portion taking 0.25 second after the reproduction starts to generate the illusion and achieves the motion of motion-intended subject region toward the moving direction indicated by the designation information. Then, the contour supplement part 62 decreases the luminance value of the target edge portion taking 3.75 seconds remained to return the luminance value of the target edge portion to the initial luminance value which is that immediately after the reproduction starts (time t=0.0) without the illusion being generated.

After the contour supplement part 62 overlaps the contour having the luminance value L(t) on the target edge portion in the output image in this way, the process proceeds to step S18. Here, the image processing at step S16 corresponds to the process (4-1) described above.

On the other hand, if determined at step S15 that the luminance value is not decreased, that is, the luminance value is increased, the process proceeds to step S17.

At step S17, the contour supplement part 62 overlaps the contour having a predetermined luminance on the target edge portion in the output image of each time such that the luminance of the target edge portion in the output image, which has decreased toward a time direction, may return to the initial luminance.

Figure 9:
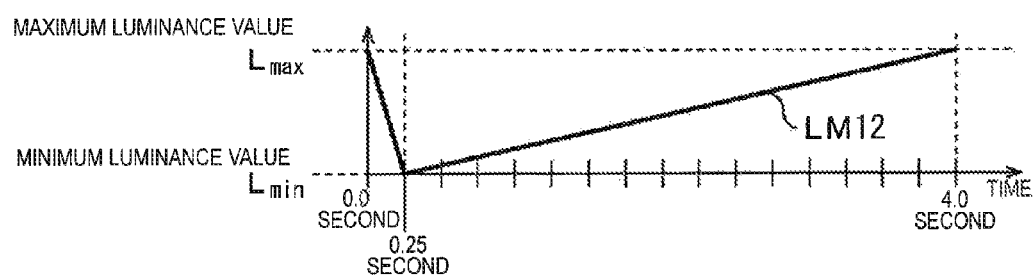
FIG. 9 shows an example of a temporal change in a luminance value of a contour.

For example, the contour supplement part 62, regarding the output image D(t) at a predetermined time t (0.0≤t≤4.0), defines a luminance value defined by a polygonal line LM12 shown in FIG. 9 as the luminance value L(t) of the contour. Here, in FIG. 9 an abscissa axis represents a time and an ordinate axis represents a luminance value.

In this example, the possible maximum value and possible minimum value as the luminance value of the pixel on the image are defined as a maximum luminance value $L_{max}$ and a minimum luminance value $L_{min}$, respectively.

In FIG. 9, the luminance value L(t) of a contour region is found at the time t=0.0 as the luminance value $L(t)=L_{max}$, and thereafter, is linearly dropped as the time t is increased, and then the luminance value $L(t)=L_{min}$ at the time t=0.25. After that, the luminance value L(t) of the contour region is linearly raised as the time t is increased, and found at the time t=4.0 as the luminance value $L(t)=L_{max}$. In this way, the luminance value at the time t indicated by the polygonal line LM12 is defined as the luminance value L(t) of the contour region at that time t.

The contour supplement part 62 after defining the luminance value L(t) at the time t, overlaps a contour composed of pixels having the luminance value L(t) on a target edge region within the motion-intended subject region of the output image D(t). This allows, when the moving image composed of the output images D(t) at the respective times is reproduced, the luminance value of the target edge portion in the output image is changed as shown in FIG. 9 by the polygonal line LM12.

That is, the contour supplement part 62 decreases the luminance value of the target edge portion taking 0.25 second after the reproduction starts to generate the illusion and achieves the motion of motion-intended subject region toward the moving direction indicated by the designation information. Then, the contour supplement part 62 increases the luminance value of the target edge portion taking 3.75 seconds remained to return the luminance value of the target edge portion to the initial luminance value which is that immediately after the reproduction starts (time t=0.0) without the illusion being generated.

After the contour supplement part 62 overlaps the contour having the luminance value L(t) on the target edge portion in the output image in this way, the process proceeds to step S18. Here, the image processing at step S17 corresponds to the process (4-2) described above.

When a contour having a predetermined luminance is overlapped on a region of the target edge portion at step S16 or step S17, the contour supplement part 62 determines at step S18 whether or not all the edges indicated by the edge information are processed as the target edge.

If determined at step S18 that all the edges are still not processed as the target edge, the process returns to step S13, and the above described processes are repeated. That is, an unprocessed edge is selected as the next target edge and a region of a portion of that target edge is overlapped by a contour having a predetermined luminance.

On the other hand, If determined at step S18 that all the edges are processed as the target edge, the process proceeds to step S19. In this case, in the output images at the respective times, all the edges detected within the motion-intended subject region may be replaces with the contour having the luminance value L(t). That is, the output moving image composed of the final output images may be obtained.

At step S19, the contour supplement part 62 outputs the output moving image composed of the output images at the respective times via the signal line 32, and the image generation process ends.

As described above, the image processing apparatus 28 detects an edge orthogonal to the moving direction from inside the motion-intended subject region in the input image, and overlaps on a region of the edge a contour having the luminance value depending on the luminance change of the pixel in the vicinity of the edge to generate the output moving image composed of the output images at the respective times.

In this way, reproduction of the output moving image which is obtained by changing the luminance value of the edge portion to generate the output images at the respective times makes it possible that a subject on the image is viewed by the user as the subject as it is while a motion of the subject is made to be able to be perceived as the illusion by the user.

[Luminance of Contour at Each Time]

Note that further the user may input an intensity about a motion amount of the motion-intended subject region by operating the user interface 26 by the user.

Figure 7:
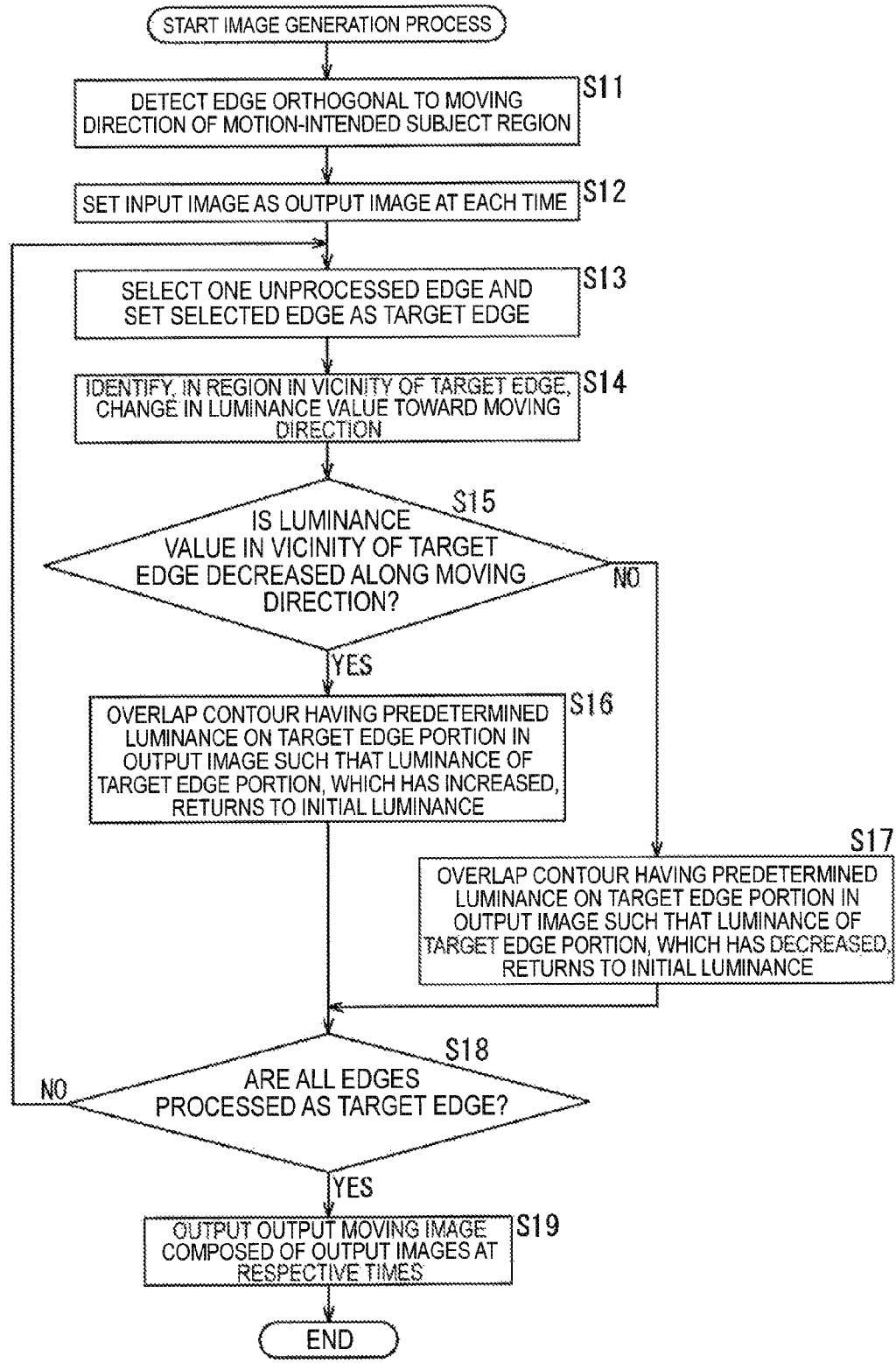
FIG. 7 is a flow chart illustrating an image generation process.

In such a case, for example, if "strong" is input as the motion amount, the region of the target edge portion is overlapped by the contours having the luminance values indicated by the polygonal line LM11 in FIG. 8 and the polygonal line LM12 in FIG. 9 at step S16 and step S17 in FIG. 7, respectively.

Figure 10:
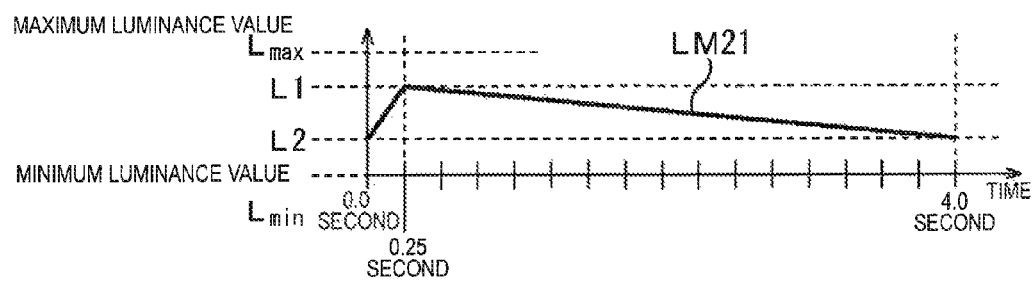
FIG. 10 shows an example of a temporal change in a luminance value of a contour.
Figure 11:
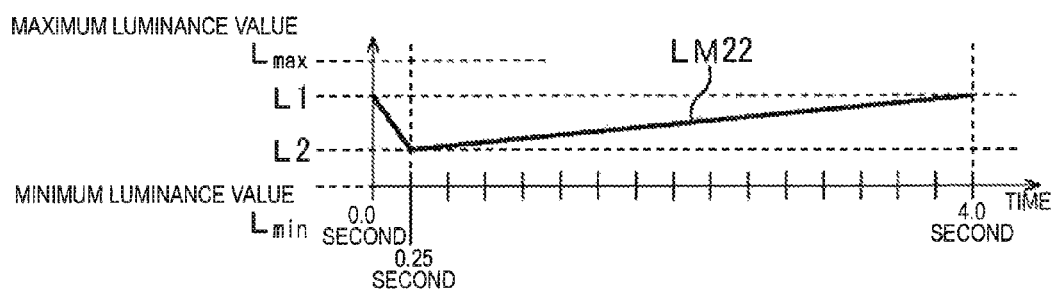
FIG. 11 shows an example of a temporal change in a luminance value of a contour.

Additionally, if "weak" is input as the motion amount, the region of the target edge portion is overlapped by the contours having the luminance values indicated by a polygonal line LM21 in FIG. 10 and a polygonal line LM22 in FIG. 11 at step S16 and step S17 in FIG. 7, respectively. Here, in FIG. 10 and FIG. 11, an abscissa axis represents a time and an ordinate axis represents a luminance value.

Specifically, if "weak" is input as the motion amount, the contour supplement part 62 at step S16, regarding the output image D(t) at a predetermined time t (0.0≤t≤4.0), defines a luminance value defined by the polygonal line LM21 shown in FIG. 10 as the luminance value L(t) of the contour.

In the example in FIG. 10, the possible maximum value and possible minimum value as the luminance value of the contour region are defined as a luminance value L1 and a luminance value L2, respectively. Here, the luminance value L1 is a luminance value less than the maximum luminance value $L_{max}$ by a predetermined value, and the luminance value L2 is a luminance value more than the minimum luminance value $L_{min}$ by a predetermined value. That is, in this case, a range of the possible value as the luminance value of the contour region is narrower than the case in FIG. 8.

In FIG. 10, the luminance value L(t) of a contour region is found at the time t=0.0 as the luminance value L(t)=L2, and thereafter, is linearly raised as the time t is increased, and then the luminance value L(t)=L1 at the time t=0.25. After that, the luminance value L(t) of the contour region is linearly dropped as the time t is increased, and found at the time t=4.0 as the luminance value L(t)=L2. In this way, the luminance value at the time t indicated by the polygonal line LM21 is defined as the luminance value L(t) of the contour region at that time t.

The contour supplement part 62 after defining the luminance value L(t) at the time t, overlaps a contour composed of pixels having the luminance value L(t) on a target edge region within the motion-intended subject region of the output image at the time t.

Moreover, if "weak" is input as the motion amount, the contour supplement part 62 at step S17, regarding the output image D(t) at a predetermined time t (0.0 t 4.0), defines a luminance value defined by the polygonal line LM22 shown in FIG. 11 as the luminance value L(t) of the contour.

In the example in FIG. 11, the possible maximum value and possible minimum value as the luminance value of the contour region are defined as a luminance value L1 and a luminance value L2, respectively. Here, the luminance value L1 and the luminance value L2 are similar to the case in FIG. 10.

In FIG. 11, the luminance value L(t) of a contour region is found at the time t=0.0 as the luminance value L(t)=L1, and thereafter, is linearly dropped as the time t is increased, and then the luminance value L(t)=L2 at the time t=0.25. After that, the luminance value L(t) of the contour region is linearly raised as the time t is increased, and found at the time t=4.0 as the luminance value L(t)=L1. In this way, the luminance value at the time t indicated by the polygonal line LM22 is defined as the luminance value L(t) of the contour region at that time t. The contour supplement part 62 after defining the luminance value L(t) at the time t, overlaps a contour composed of pixels having the luminance value L(t) on a target edge region within the motion-intended subject region of the output image D(t).

In the examples shown in FIG. 10 and FIG. 11, since the change in the luminance value is smaller as compared with the cases in FIG. 8 and FIG. 9, the illusion with less motion may be perceived.

[Illusion in Region Different from Motion-Intended Subject Region]

In the above description, the example is described in which the input image is subjected to the image processing for generating the illusion as if the motion-intended subject region might be moving. In addition to this, the user may further designate a region other than the motion-intended subject region on the input image, that is, a background region as still another motion-intended subject region, and may designate a direction opposite to the previously designated moving direction of the motion-intended subject region as the moving direction of the another motion-intended subject region.

In such a case, the input image is subjected to the image processing for generating the illusion as if the background region designated as the another motion-intended subject region might be moving toward a direction opposite to the moving direction of the motion-intended subject region.

Figure 12:
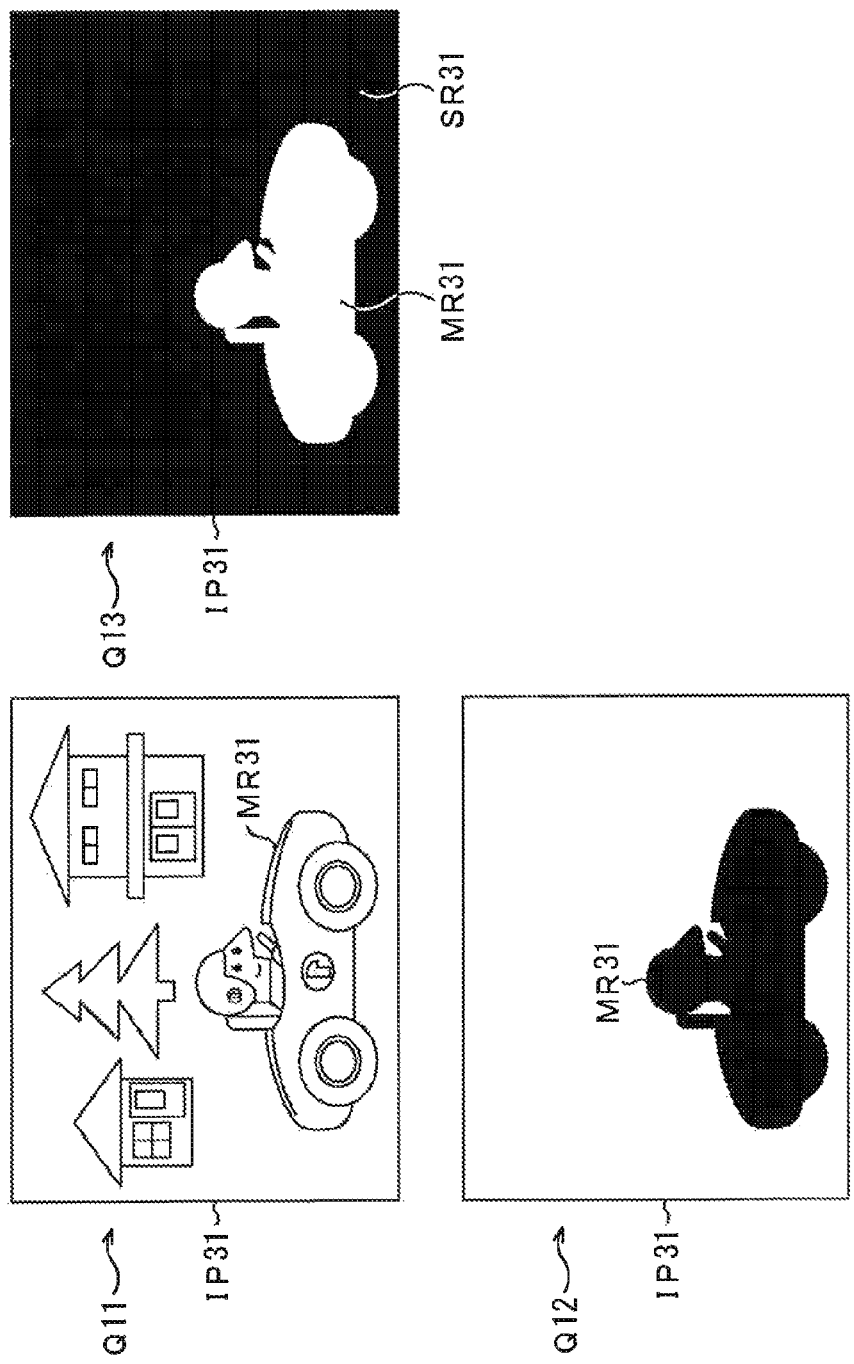
FIG. 12 shows an example of each of an input image and a motion-intended subject region.

For example, assuming that an input image IP31 in FIG. 12 denoted by an arrow Q11 is supplied from the image data storage unit 25 to the image processing apparatus 28. This input image IP31 has a region MR31 in which a vehicle shows up as a subject.

Assuming that the user operates the user interface 26 concerning such a input image IP31 to designate the region MR31 of the vehicle as a region of the subject intended to be moved, that is, the motion-intended subject region as indicated by an arrow Q12.

Here, it is preferable that the motion-intended subject region designated by the user may be defined to have a size larger in some degree than the region in which the subject intended to be moved is actually projected because an edge of a profile of the vehicle can be detected by the edge detection part 61.

In addition, the user designates the region MR31 as the motion-intended subject region as well as operates the user interface 26 to designate the moving direction of the motion-intended subject region at the same time. For example, assuming that here, information is input that the region MR31 is intended to be moved from left to right in the figure.

Here, the output moving image for four seconds to be desirably obtained finally is a moving image which is perceived as the illusion as if the vehicle of the region MR31 might be moving from left to right. This may be, conversely, a moving image which is perceived as if a portion (background portion) other than the vehicle in the input image IP31 might be moving from right to left. Furthermore, it may be a moving image to be perceived as these two illusions. That is, a moving image may be which is perceived as if the vehicle of the region MR31 might be moving from left to right and the background portion other than the vehicle might be moving from right to left.

Therefore, as indicated by an arrow Q13, not only the region MR31 but also a region SR31 which is the background portion other than the region MR31 in the input image IP31 is designated as the motion-intended subject region so that the moving image perceived as if the vehicle region and the background region might be moving may be obtained as the output moving image. In this case, the moving direction of the region SR31 designated as the motion-intended subject region is designated as a right-to-left direction.

In this way, in the input image, a plurality of motion-intended subject regions and the moving directions of those motion-intended subject regions may be designated.

Subsequently, the process of the image processing apparatus 28 in such a case will be described. Here, since the input image IP31 shown in FIG. 12 is an image complicated in its pictures, a description will be given of an example in which the input image IP31 in FIG. 12 is patterned with reference to FIG. 13 below.

Figure 13:
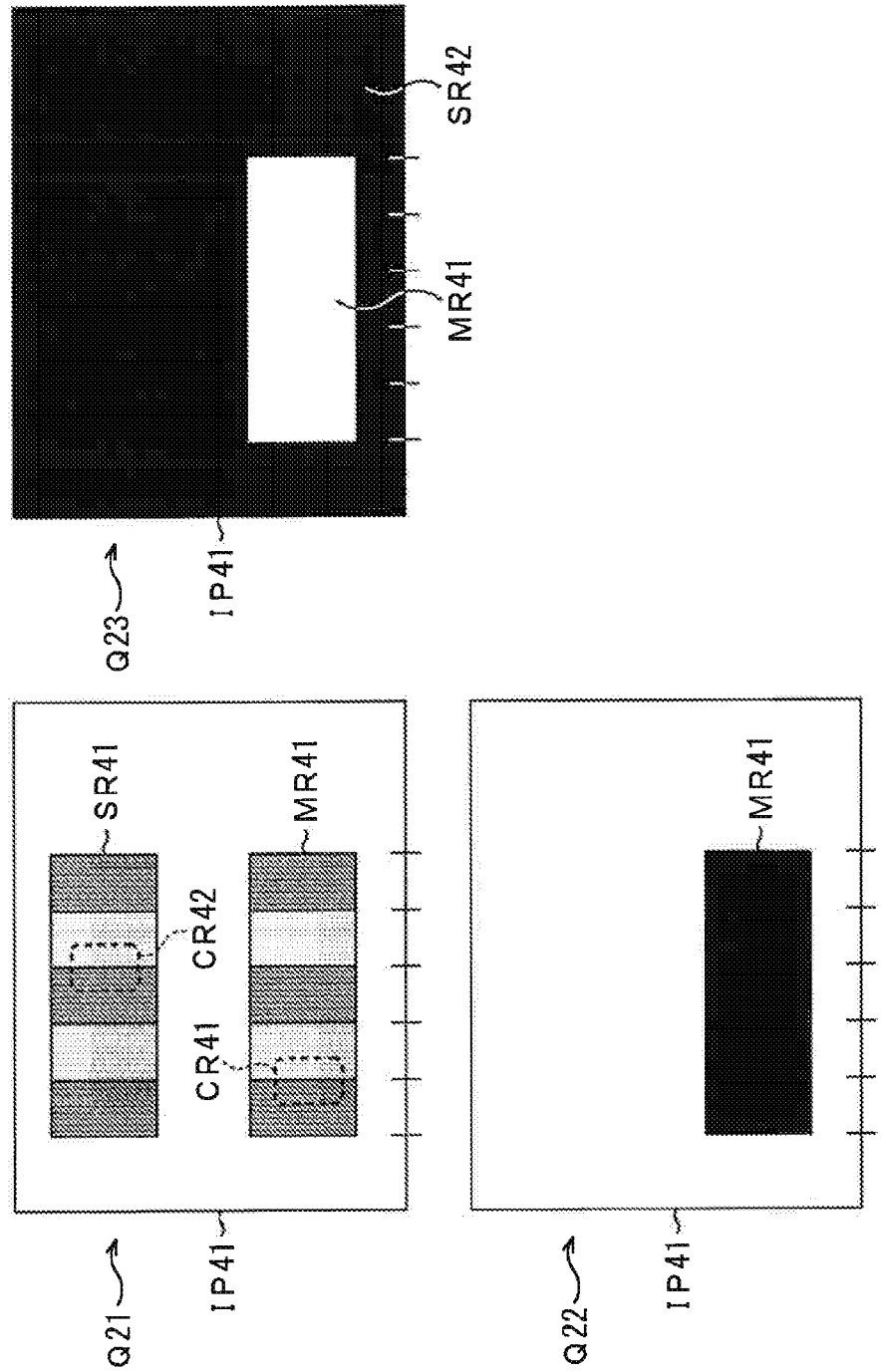
FIG. 13 shows an example of each of an input image and a motion-intended subject region.

As shown in FIG. 13 denoted by an arrow Q21, assuming that an input image IP41 corresponding to the input image IP31 in FIG. 12 is to be processed.

In the input image IP41, a subject with a stripe pattern showing up in the region SR41 located on the upper hand side in the figure corresponds to a subject of a tree or house on the background in the input image IP31, and a subject with a stripe pattern showing up in the region MR41 located on the lower hand side in the figure corresponds to the vehicle portion in the input image IP31.

Here, a region CR41 and region CR42 in the input image IP41 are regions for identifying the luminance change in the vicinity of the edge described later.

The user, as indicated by an arrow Q22, designates the region MR41 in the input image IP41 as the region intended to be moved, that is, the motion-intended subject region as well as designates the moving direction of the region MR41 as a left-to-right direction.

In addition, the user intends to move a background region, with respect to the region MR41, in a direction opposite to the moving direction of the region MR41, and therefore, as indicated by an arrow Q23, designates a region SR42 other than the region MR41 in the input image IP41 as another region intended to be moved, that is, the second motion-intended subject region. Further, the user designates the moving direction of the region SR42 as a right-to-left direction.

Here, the case is described where the user designates not only the region MR41 that is a region intended to be moved and the moving direction thereof but also the region SR42 that is a background region and the moving direction thereof, but the region SR42 and the moving direction thereof may be designated by the image processing apparatus 28.

That is, in such a case, if the user designates the region MR41 and the moving direction thereof, the image processing apparatus 28 sets the region SR42 that is a region other than the region MR41 in the input image IP41 as another motion-intended subject region. Additionally, the image processing apparatus 28 sets the moving direction of the region SR42 as a direction opposite to the moving direction of the region MR41 designated by the user.

Moreover, in FIG. 13, a scale is added to a lower side of the input image IP41 for facilitating understanding of a positional relationship between the subjects, but this scale does not actually exist in the input image IP41. The scale like this is also added in FIG. 14 and FIG. 15 described later.

As described above, when a plurality of motion-intended subject regions are designated, an edge detection is carried out for each of the motion-intended subject regions at step S11 in the image generation process described with reference to FIG. 7.

For example, in the region MR41 designated as the motion-intended subject region, which is a region intended to be moved from left to right, an edge is detected which has a direction orthogonal to a left-to-right, that is, orthogonal to the horizontal direction. Further, in the region SR42 designated as another motion-intended subject region, which is a region intended to be moved from right to left, an edge is detected which has a direction orthogonal to a right-to-left direction, that is, orthogonal to the horizontal direction.

Figure 14:
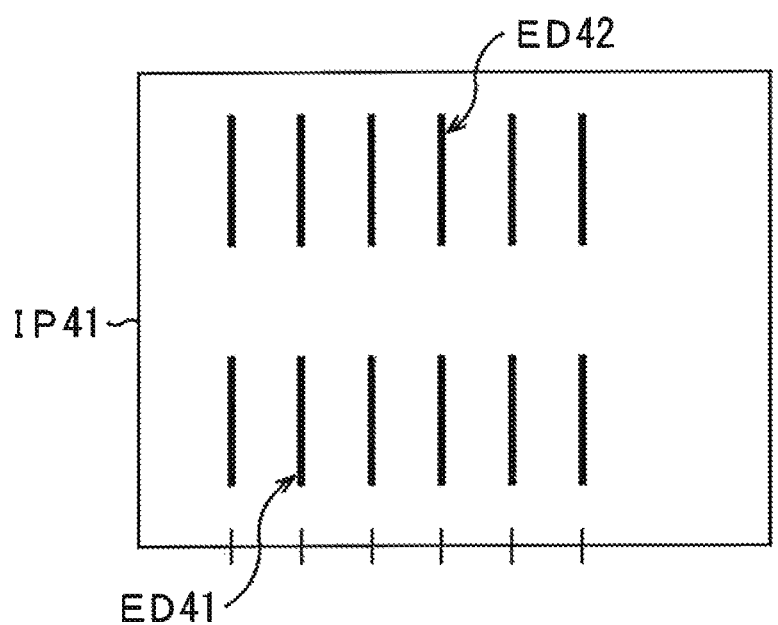
FIG. 14 shows an edge detected from an input image.

This gives a result shown in FIG. 14. In the input image IP41 shown in FIG. 14, vertical direction lines represent the edges detected by the edge detection part 61 in the process in FIG. 7 at step S11.

For example, an edge ED41 and an edge ED42 each are boundaries between the vertical stripes in the region MR41 and the region SR41, respectively, shown in FIG. 13.

When the edge is detected from each motion-intended subject region, the change in the luminance value of the region in the vicinity of each detected edge is identified.

For example, when the change in luminance value of the edge ED41 is examined, identified is how the luminance value of each of the pixels is changed in the region CR41 in FIG. 13 as a region in the vicinity of the edge ED41 along the moving direction of the region MR41. In this case, since the moving direction of the region MR41 is a left-to-right direction, it is found that the region CR41 is increased in the luminance value along the moving direction. Accordingly, the edge ED41 is subjected to the process of step S17 in the image generation process in FIG. 7.

Similarly, when the change in luminance value of the edge ED42 in FIG. 14 is examined, identified is how the luminance value of each of the pixels is changed in the region CR42 in FIG. 13 as a region in the vicinity of the edge ED42 along the moving direction of the region SR42. In this case, since the moving direction of the region SR42 is a right-to-left direction, it is found that the region CR42 is decreased in the luminance value along the moving direction. Accordingly, the edge ED42 is subjected to the process of step S16 in the image generation process in FIG. 7.

Other edges shown in FIG. 14 are also subjected to the processes similar to those for the edge ED41 or the edge ED42.

Figure 15:
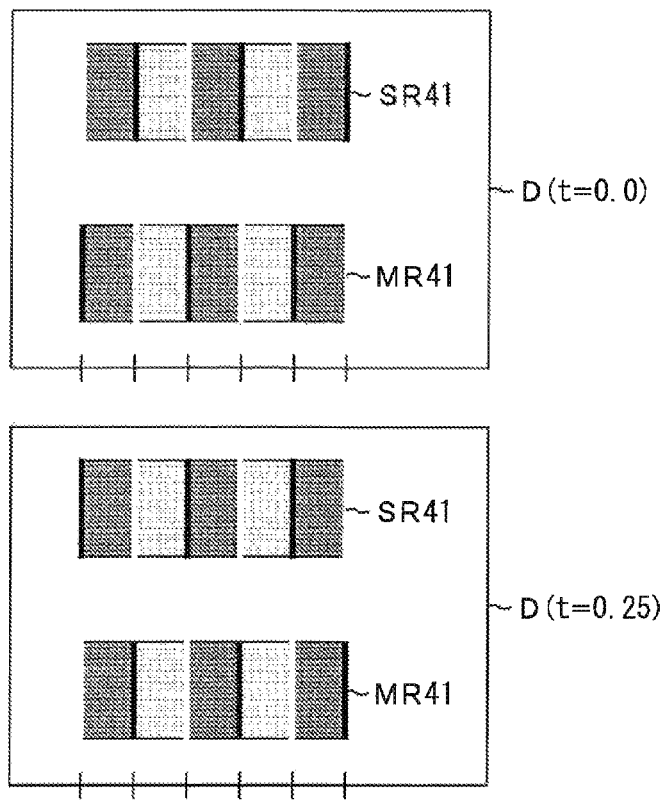
FIG. 15 shows an example of an output image.

In this way, the respective edges may be subjected to the processes of step S16 or step S17 to finally obtain the output images D(t) at the respective times. For example, the output image D(t=0.0) or output image D(t=0.25) shown in FIG. 15 is obtained as the output image D(t). Here, the elements in FIG. 15 corresponding to those in FIG. 13 are denoted by the same signs, and the description thereof is appropriately omitted.

The output image D(t=0.0) is an output image D(t) reproduced at 0 second, and the output image D(t=0.25) is an output image D(t) reproduced at 0.25 second. In this example, a black contour region on the output image D(t=0.0) is white on the output image D(t=0.25), and a white contour region on the output image D(t=0.0) is black on the output image D(t=0.25).

If the output images D(t) at the respective times are reproduced as the 4 seconds duration moving image, from 0 second to 0.25 second, the viewer is made to perceive the illusion as if the region MR41 might be moving from left to right and the region SR42 might be moving from right to left. Then, from 0.25 second to 4 second, the viewer perceives that the respective subjects remain still.

Here, a further plurality of sets of the motion-intended subject regions and moving directions may be defined differently in timings for the illusions to be generated.

That is, for example, the region MR41 in FIG. 13 is subjected to the processes of step S13 to step S17 without offset as described above. Then, the region SR42 in FIG. 13 is subjected to the processes of step S13 to step S17, for example, with two seconds offset being given. Specifically, the edge portion of the region SR42 is overlapped at step S16 and step S17 by a contour having the luminance value at each time shown in FIG. 16 and FIG. 17 instead of the luminance value at each time shown in FIG. 8 and FIG. 9.

Figure 16:
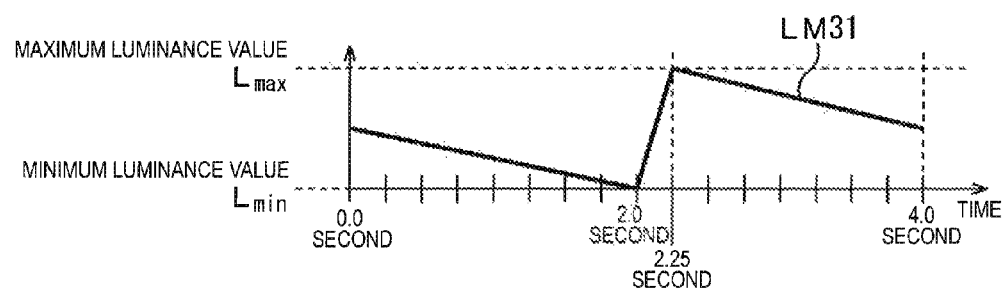
FIG. 16 shows an example of a temporal change in a luminance value of a contour.
Figure 17:
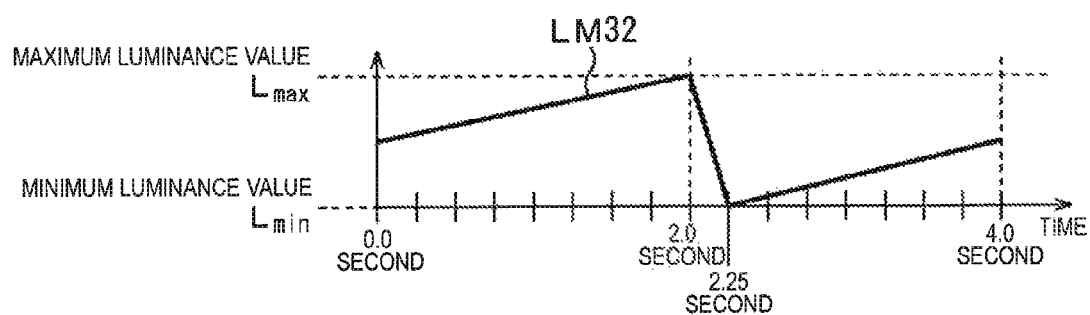
FIG. 17 shows an example of a temporal change in a luminance value of a contour.

Here, in FIG. 16 and FIG. 17, an abscissa axis represents a time and an ordinate axis represents a luminance value.

For example, when the target edge detected within the region SR42 is subjected to the process of step S16, the target edge is overlapped by a contour having the luminance value L(t) indicated by a polygonal line LM31 in FIG. 16.

In FIG. 16, the luminance value L(t) of the contour region is found at the time t=0.0 as a middle luminance value between the maximum luminance value and the minimum luminance value (hereinafter, referred to as middle luminance value). After that, the luminance value L(t) is linearly dropped as time t is increased, and found at the time t=2.0 as the luminance value $L(t)=L_{min}$.

Moreover, thereafter, the luminance value L(t) of the contour region is linearly raised from at the time t=2.0 as the time t is increased, after found at the time t=2.25 as the luminance value $L(t)=L_{max}$, is linearly dropped as the time t is increased, and found at the time t=4.0 as the middle luminance value.

In this way, when the luminance value L(t) at the time t is defined, the target edge region within the motion-intended subject region of the output image D(t) is overlapped by a contour composed of pixels having the luminance value L(t). As a result, when the moving image composed of the output images D(t) at the respective times is reproduced, the luminance value of the target edge portion in the output image is changed as shown in FIG. 16 by the polygonal line LM31.

Further, when the target edge detected within the region SR42 in FIG. 13 is subjected to the process of step S17, the target edge is overlapped by a contour having the luminance value L(t) indicated by a polygonal line LM32 in FIG. 17.

In FIG. 17, the luminance value L(t) of the contour region is found at the time t=0.0 as the middle luminance value, and thereafter, the luminance value L(t) is linearly raised as the time t is increased to be found at the time t=2.0 as the luminance value L(t)=$L_{max}$.

Moreover, thereafter, the luminance value L(t) of the contour region is linearly dropped from at the time t=2.0 as the time t is increased, after found at the time t=2.25 as the luminance value L(t)=$L_{min}$, is linearly raised as the time t is increased, and found at the time t=4.0 as the middle luminance value.

In this way, when the luminance value L(t) at the time t is defined, the target edge region within the motion-intended subject region of the output image D(t) is overlapped by a contour composed of pixels having the luminance value L(t). As a result, when the moving image composed of the output images D(t) at the respective times is reproduced, the luminance value of the target edge portion in the output image is changed as shown in FIG. 17 by the polygonal line LM32.

The region SR42 in each of the output images is overlapped by the contour having the luminance value shown in FIG. 16 or FIG. 17, and if the resultant output images D(t) at the respective times are reproduced as the moving image for four seconds, a result thereof is as follows.

Specifically, from 0 second to 0.25 second, the viewer is made to perceive as if the region MR41 might be moving from left to right, and from 0.25 second to 4.0 second, the viewer is made to perceive that the region MR41 remains still. Additionally, from 2.0 second to 2.25 second, the viewer is made to perceive as if the region SR42 might be moving from right to left, and from 2.25 second to 4.0 second as well as 0 second to 2.0 second, the viewer is made to perceive that the region SR42 remains still.

Therefore, in the two periods from 0 second to 0.25 second and from 2.0 second to 2.25 second during four seconds, the viewer may be made to perceive the illusion.

As described above, the image processing apparatus 28 makes it possible to obtain the output moving image for four seconds as if the subject projected in the input image might be moving.

Here, the description above describes that a region of a subject intended to be moved and a direction in which the subject is intended to be moved are designated by the user, but the image processing apparatus 28 or the information processing apparatus 11 may detect an actual motion-intended subject region and moving direction.

For example, if the imaging unit 21 continuously shoots a plurality of input images, the actually moving subject and the moving direction thereof can be found from differences between the shot input images. Then, the found motion-intended subject region and moving direction may be sets as the motion-intended subject region and moving direction indicated by the designation information. Here, the technique for finding the motion-intended subject and the moving direction from the differences between a plurality of images is called the optical flow calculation issue, and many techniques are known as a method like this, of which description will be omitted.

Second Embodiment

[Configuration Example of Image Processing Apparatus]

Additionally, the description above describes that the luminance value of the edge portion in the output image is changed to make the motion-intended subject region appear as if moving, but the motion-intended subject region may be added with an effect line to express a motion of the motion-intended subject region.

Here, an effect line is a line drawn along the moving direction of an object in order to express the motion of the object in a cartoon or the like. The effect line may be added to the motion-intended subject region on the output image to make the viewer feel a more dynamic motion.

Figure 18:
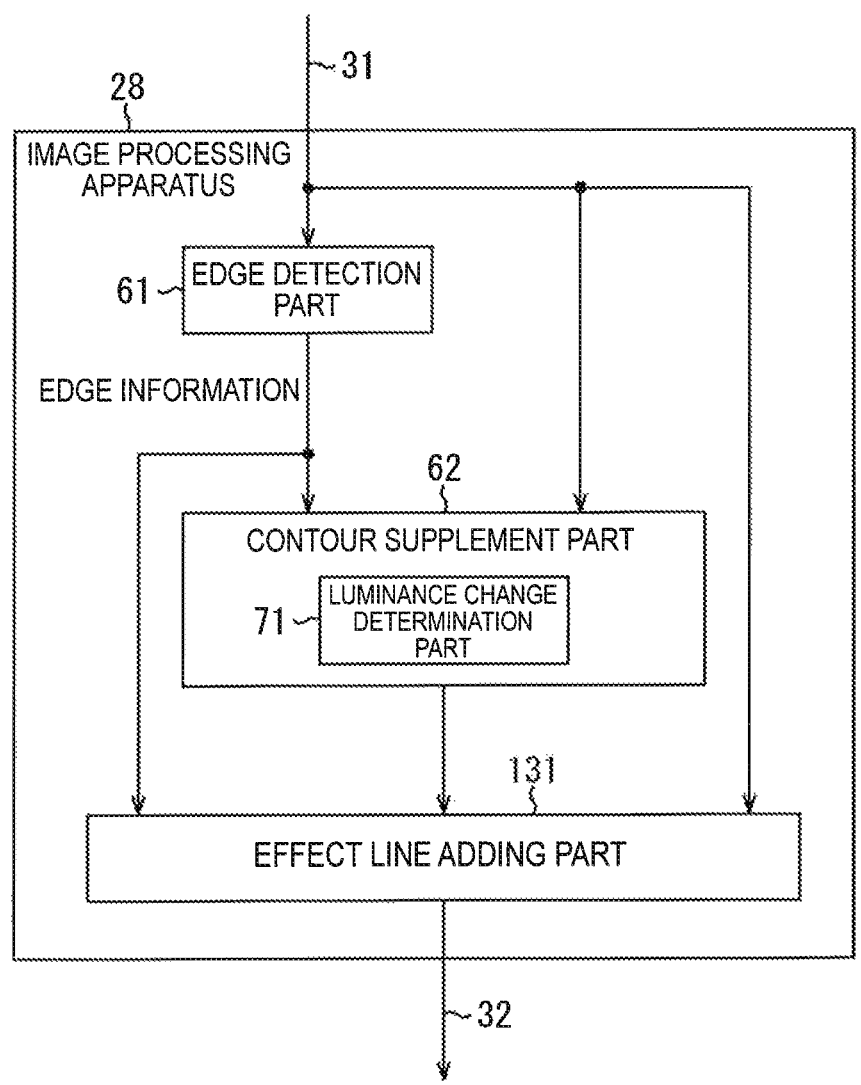
FIG. 18 shows another configuration example of an image processing apparatus.

In the case where the effect line is added to the motion-intended subject region, the image processing apparatus 28 is configured as shown in FIG. 18, for example. Here, the elements in FIG. 18 corresponding to those in FIG. 6 are denoted by the same signs, and the description thereof is appropriately omitted.

The image processing apparatus 28 shown in FIG. 18 includes the edge detection part 61, the contour supplement part 62 and an effect line adding part 131. That is, the image processing apparatus 28 in FIG. 18 has a configuration of the image processing apparatus 28 in FIG. 6 further provided with the effect line adding part 131.

The effect line adding part 131 is supplied with the designation information via the signal line 31. The effect line adding part 131 is also supplied with the edge information from the edge detection part 61 as well as supplied with the output image having the contour added from the contour supplement part 62.

The effect line adding part 131 adds, regarding the output image at each time supplied from the contour supplement part 62, the effect line along the moving direction to the edge portion of the motion-intended subject region on the output image to give the final output image. The effect line adding part 131 outputs the resultant output image via the signal line 32 to the display unit 23 or the like.

[Description of Image Generation Process]

Next, a description will be given of the image generation process performed when the image processing apparatus 28 has a configuration shown in FIG. 18 with reference to a flow chart in FIG. 19. Here, processes from step S61 to step S68 are similar to those in FIG. 7 from step S11 to step S18, and the description thereof is omitted.

If determined at step S68 that all the edges are processed as the target edge, the contour supplement part 62 supplies the output image D(t) at each time to the effect line adding part 131, and the process proceeds to step S69. Here, the output image D(t) at each time supplied to the effect line adding part 131 is the same as the output image output in the process in FIG. 7 at step S19.

At step S69, the effect line adding part 131, on the basis of the edge information supplied from the edge detection part 61, selects one edge which has not been subjected to an effect line adding process from the edges detected within the motion-intended subject region on the input image, and sets the selected edge as a target edge.

At step S70, the effect line adding part 131 designates a region to be added with the effect line as an effect line addition region.

For example, the effect line adding part 131 designates, for each output image, a region having a length of twenty pixels and a width of two pixels from the target edge in the output image in a direction opposite to the moving direction of the motion-intended subject region as the effect line addition region. At this time, the effect line adding part 131 provides a plurality of effect line addition regions with respect to the target edge such that the respective effect line addition regions are arranged in a target edge direction at intervals of two pixels.

Figure 20:
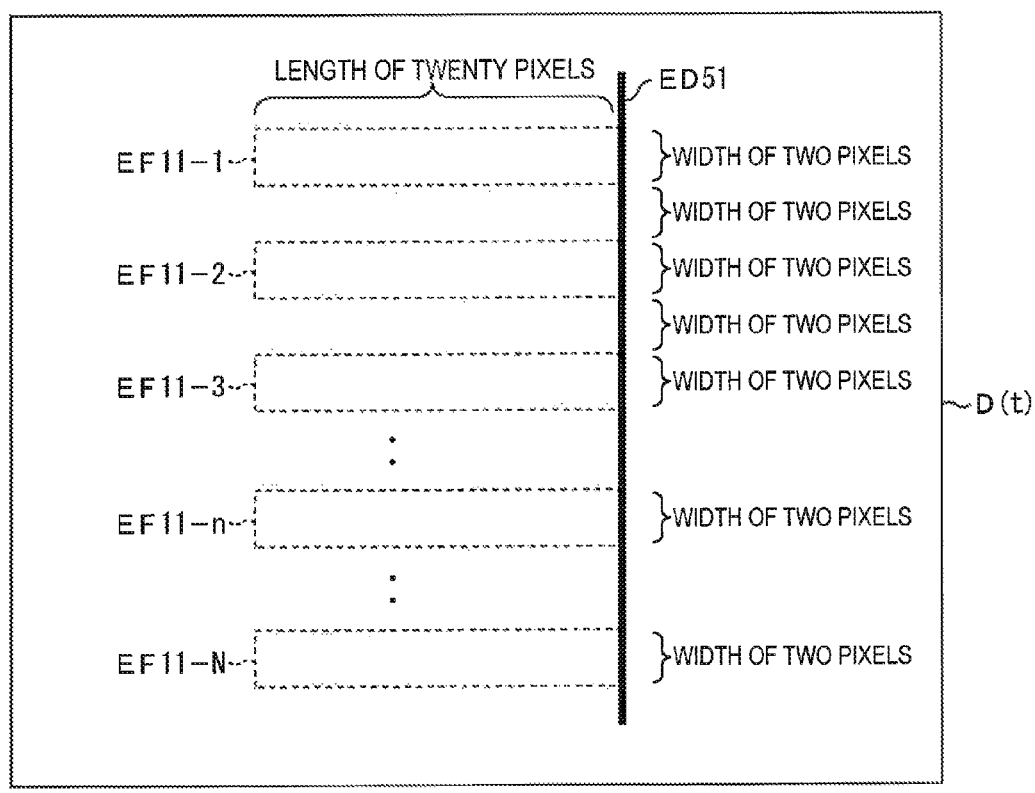
FIG. 20 illustrates an effect line addition region.

This allows effect line addition regions EF11-1 to EF11-N shown in FIG. 20, for example, to be provided.

In the example in FIG. 20, an edge ED51 on the output image D(t) is set as the target edge, and the moving direction of the motion-intended subject region including the edge ED51 is set as a left-to-right direction in the figure. Accordingly, the effect line addition regions EF11-1 to EF11-N are provided on an opposite side to the moving direction of the edge ED51, that is, on the left hand side in the figure.

The effect line addition regions EF11-1 to EF11-N are each a region having a width of two pixels in the vertical direction in the figure and a length of twenty pixels in the horizontal direction, and the effect line addition regions adjacent in the vertical direction in the figure are arranged at a distance of two pixels from each other. Note that, hereinafter, the effect line addition regions EF11-1 to EF11-N are, if not necessary to be distinguished, simply referred to as effect line addition region EF11.

Further, the description is given here that the effect line addition region EF11 is a region having two pixels×twenty pixels 20, but the width or length of the effect line addition region EF11 is not limited these value and may be any value.

In addition, the user may operate the user interface 26 to input an intensity about a motion amount of the motion-intended subject region. In such a case, for example, if "strong" is input as the motion amount, the effect line addition region EF11 is set to have a length longer than twenty pixels, and if "weak" is input as the motion amount, the effect line addition region EF11 is set to have a length shorter than twenty pixels.

Figure 19:
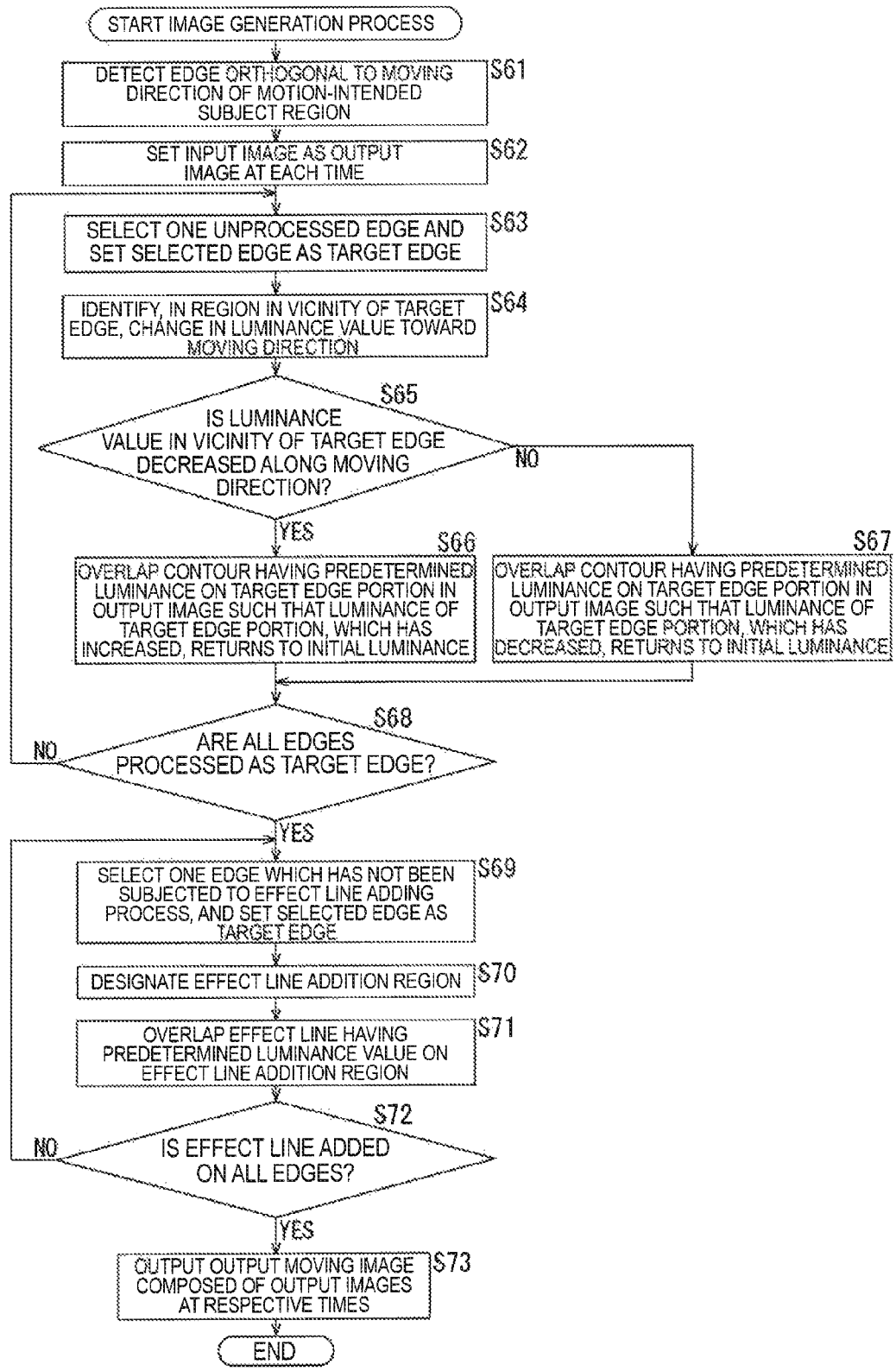
FIG. 19 is a flow chart illustrating an image generation process.

Returning to the description of the flow chart in FIG. 19, if the effect line addition region is designated at step S70, the process proceeds to step S71 thereafter.

At step S71, the effect line adding part 131 overlaps an effect line having a predetermined luminance value on the effect line addition region in each output image D(t).

Specifically, the effect line adding part 131 overlaps on the effect line addition region the effect line having the region of which luminance value is defined by a wave travelling in a direction opposite to the moving direction of the motion-intended subject region, that is, a wave in which the luminance values are trigonometric function.

Figure 21:
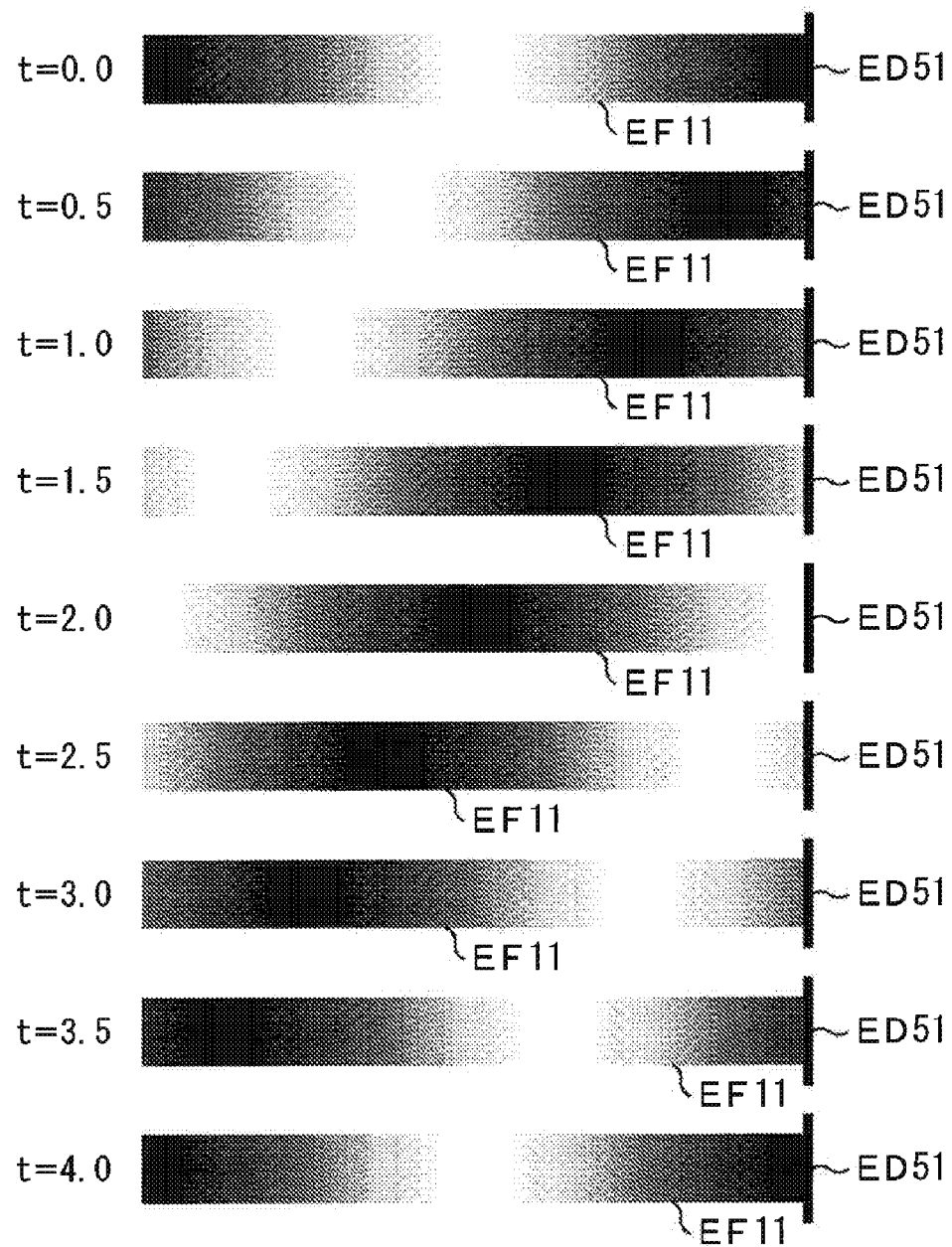
FIG. 21 shows an example of an effect line overlapped on an effect line addition region.

This allows the effect line addition region at each time to be overlapped as shown in FIG. 21, for example. Here, the elements in FIG. 21 corresponding to those in FIG. 20 are denoted by the same signs, and the description thereof is appropriately omitted.

FIG. 21 shows the effect line addition regions EF11 overlapped by the effect line for the output images D(t) at the time t=0.0, 0.5, 1.0, 1.5, 2.0, 2.5, 3.0, 3.5, 4.0 second, and the times of the output images D(t) are indicated correspondingly to the effect line addition regions EF11 in the left hand side in the figure. Here, the N pieces of effect line addition regions EF11 provided to the target edge in the output image D(t) at the identical time are overlapped by the effect line of the identical pattern.

For example, the uppermost effect line addition region EF11 in the figure shows the effect line addition region EF11 on the output image D(t) at the time t=0.0. In this example, the luminance of a region for the effect line overlapped on each of the effect line addition regions EF11 is periodically changed such as continuously increased or decreased toward the leftward direction in the figure.

Specifically, the effect line addition region EF11 has both ends of black regions with a low luminance and a center region of white region with a high luminance, and the effect line addition region EF11 entirely has a wave pattern of white (high luminance) and black (low luminance) appearing periodically. Then, the wave travels in a direction opposite to the moving direction of the motion-intended subject region. In this case, since the moving direction is a left-to-right direction, the white region on the effect line addition region EF11 moves from right to left with time.

Here, in this example, since a reproduction duration of the output moving image is four seconds, the wave of the luminance of the effect line overlapped on the effect line addition region EF11 may have a period of four seconds. Owing to this, the effect line at the time t=0.0 and the effect line at the time t=4.0 are to be the effect lines having the same pattern, therefore, when the output moving image for four seconds is repeatedly reproduced, the reproduction may be carried out without fail.

Note that FIG. 21 shows the effect lines at the time t=0.0, 0.5, 1.0, 1.5, 2.0, 2.5, 3.0, 3.5, 4.0 second only, but the effect lines at other times also have the wave pattern travelling from right to left similarly.

Returning to the description of the flow chart in FIG. 19, when the effect line addition region in the output image at each time for the target edge is overlapped by the effect line in which the luminance of each region is periodically changed toward a direction opposite to the moving direction, the process proceeds from step S71 to step S72.

At step S72, the effect line adding part 131 determines whether or not all the edges are subjected to the effect line adding process. For example, if all the edges are handled as the target edge and the effect line is overlapped on the effect line addition region provided with respect to the target edge, all the edges are determined to have been processed.

If determined all the edges are not subjected to the effect line adding process at step S72, the process returns to step S69 and the above described processes are repeated.

On the other hand, if determined at step S72 that all the edges are subjected to the effect line adding process, the process proceeds to step S73. In this case, for the output image at each time, all the edges detected within the motion-intended subject region may be added with the effect line to give the output moving image composed of the final output images.

The image generation process in FIG. 19 designates the effect line addition regions with respect to the edge at intervals of two pixels. Therefore, the output image can be obtained in which the illusion is generated by the overlapped contour in a region in the edge portion not designated as the effect line addition region, and the motion is expressed by the effect line in a region in the edge portion designated as the effect line addition region.

At step S73, the effect line adding part 131 outputs the output moving image composed of the output images at the respective times via the signal line 32, and the image generation process ends.

As described above, the image processing apparatus 28 detects the edge orthogonal to the moving direction from within the motion-intended subject region in the input image, and overlaps the contour having the luminance changing with time on the regions of the edge as well as adds the effect line to the edge portion to generate the output moving image.

In this way, since the edge portion is added with the effect line having the luminance periodically changing in the spatial direction and the time direction, the user viewing the output moving image can be made to feel a more dynamic motion.

In the above description, the example is described in which the effect line addition regions are designated at intervals of two pixels with respect to the edge and the effect line is overlapped on those effect line addition regions, but the effect line may be added by use of any method.

For example, in the case where the contour is supplemented utilizing the luminance change shown in FIG. 8 and FIG. 9, the illusory motion is expressed in the output images at a time from 0 second to 0.25 second, but the illusion is not generated from 0.25 second to 4 second such that the viewer sees the subject remaining still.

Accordingly, the output images at a time from 0 second to 0.25 second may be not added with the effect line and only the output images at a time from 0.25 second to 4 second may be added with the effect line. This makes is possible that when the output moving image is reproduced, the subject is perceived as if to move from 0 second to 0.25 second by illusion, and the motion is expressed from 0.25 second to 4 second by the effect line.

How to obtain the output moving image like this is as described below, for example.

Figure 22:
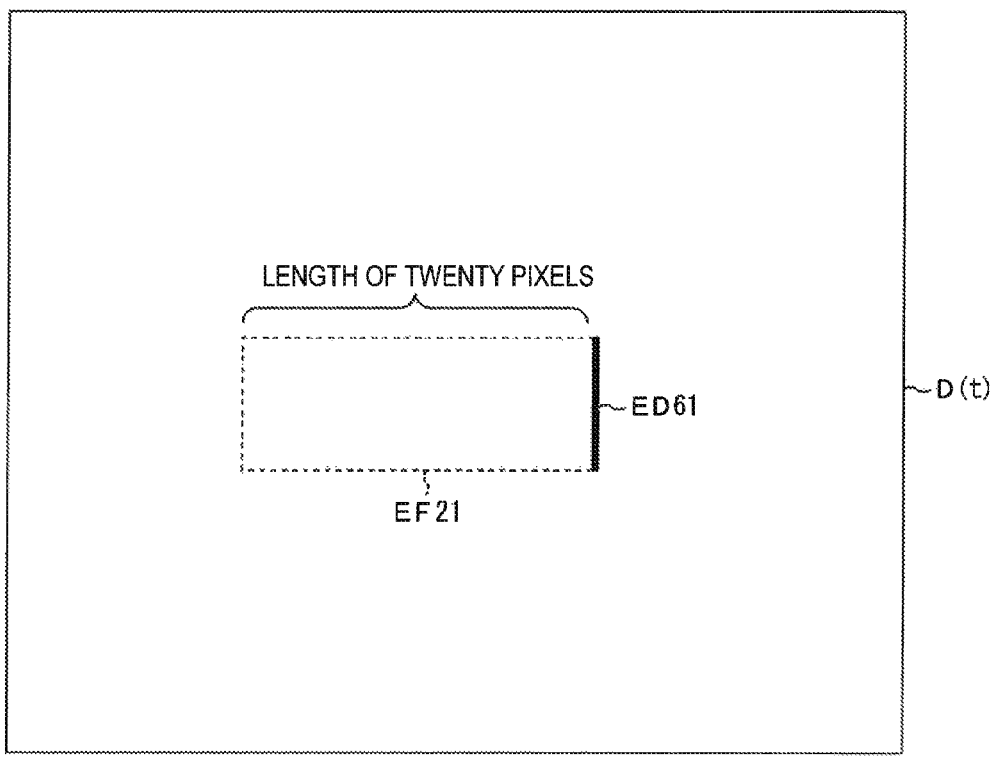
FIG. 22 illustrates an effect line addition region.

Specifically, designated is as the effect line addition region, for example, as shown in FIG. 22, a region having a length of twenty pixels in a direction opposite to the moving direction of the motion-intended subject region from on the edge ED61 detected in the output image D(t). This allows to an effect line addition region EF21 to be designated which has a width the same as the edge ED61 and a length of twenty pixels in the horizontal direction in the figure.

In this example, the moving direction of the motion-intended subject region including the edge ED61 on the output image D(t) is a left-to-right direction in the figure. Therefore, the effect line addition region EF21 is provided on the opposite side to the moving direction of the edge ED61, that is, on the left hand side in the figure. Additionally, a width of the effect line addition region EF21 in the vertical direction in the figure is the width of the edge ED61.

Figure 23:
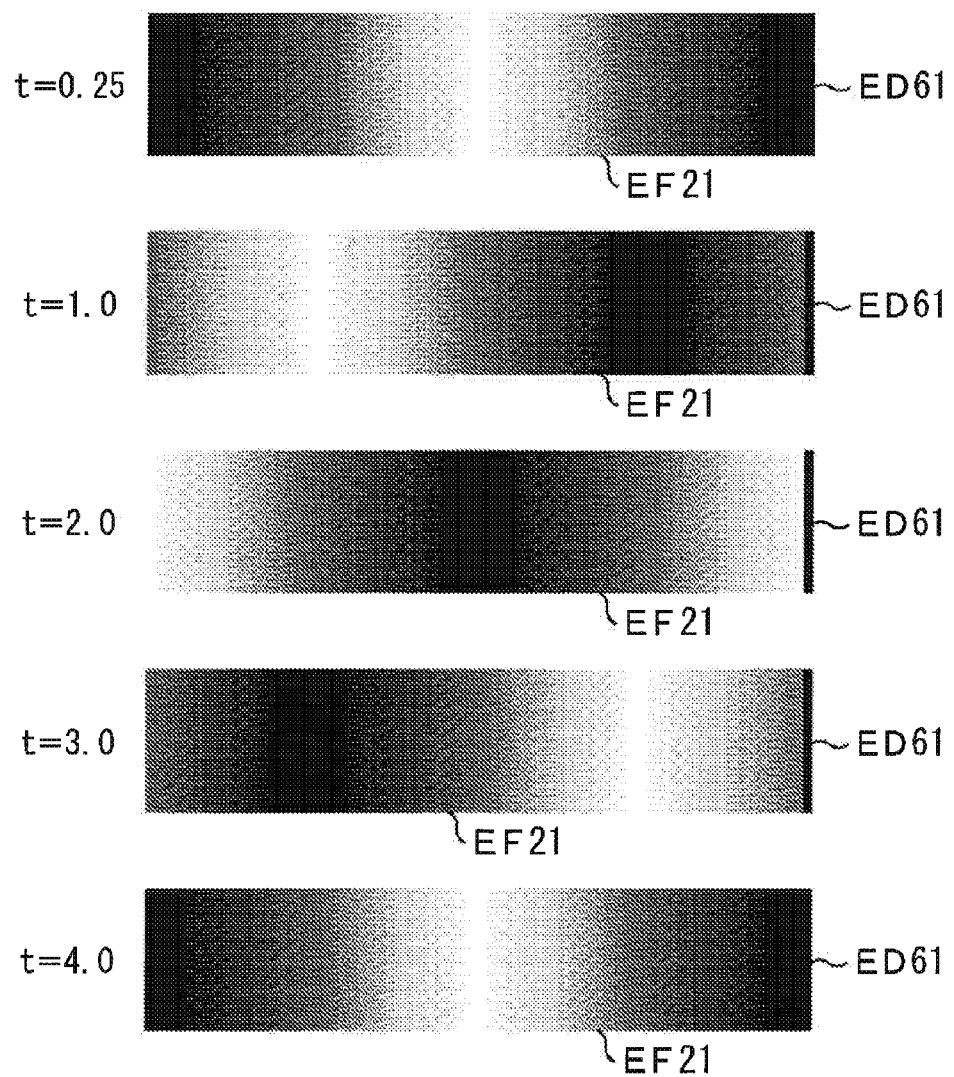
FIG. 23 shows an example of an effect line overlapped on an effect line addition region.

In this way, if the effect line addition region EF21 is designated, the effect line shown in FIG. 23 is overlapped on the effect line addition region EF21 in the output image having a portion of the edge ED61 overlapped by the contour. However, the output images from 0 second to 0.25 second are not overlapped by the effect line, and the output images from 0.25 second to 4 second only are overlapped by the effect line.

FIG. 23 shows the effect line addition regions EF21 overlapped by the effect line for the output images D(t) at the time t=0.25, 1.0, 2.0, 3.0, 4.0 second, and the times of the output images D(t) are indicated correspondingly to the effect line addition regions EF21 in the left hand side in the figure. Here, the elements in FIG. 23 corresponding to those in FIG. 22 are denoted by the same signs, and the description thereof is appropriately omitted.

For example, the uppermost effect line addition region EF21 in the figure shows the effect line addition region EF21 on the output image D(t) at the time t=0.25. In this example, the luminance of the effect line overlapped on the each of the effect line addition regions EF21 is periodically changed toward the leftward direction in the figure, therefore, the luminance of the effect line is also periodically changed in the time direction.

That is, the effect line addition region EF21 is overlapped by the effect line having a wave pattern of the luminance which travels in direction opposite to the moving direction of the motion-intended subject region. In other words, the effect line overlapped on the effect line addition region EF21 has a pattern (wave pattern) of which the luminance value is changed toward a direction opposite to the moving direction of the motion-intended subject region, and this pattern travels with time in a direction opposite to the moving direction of the motion-intended subject region in the effect line addition region EF21.

Note that FIG. 23 shows the effect lines at the time t=0.25, 1.0, 2.0, 3.0, 4.0 second only, but the effect lines at other times have the wave pattern travelling from right to left similarly.

The above processes make it possible that when the obtained output moving image is reproduced, the subject is perceived from 0 second to 0.25 second as the illusion as if moving, and the motion is expressed by the effect line from 0.25 second to 4 second.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 24 is a block diagram showing an example configuration of the hardware of a computer that executes the series of processes described earlier according to a program.

In the computer, a central processing unit (CPU) 201, a read only memory (ROM) 202 and a random access memory (RAM) 203 are mutually connected by a bus 204.

An input/output interface 205 is also connected to the bus 204. An input unit 206, an output unit 207, a storage unit 208, a communication unit 209, and a drive 210 are connected to the input/output interface 205.

The input unit 206 is configured from a keyboard, a mouse, a microphone, an imaging device, or the like. The output unit 207 configured from a display, a speaker or the like. The storage unit 208 is configured from a hard disk, a non-volatile memory or the like. The communication unit 209 is configured from a network interface or the like. The drive 210 drives a removable media 211 such as a magnetic disk, an optical disk, a magneto-optical disk, a semiconductor memory or the like.

In the computer configured as described above, the CPU 201 loads a program that is stored, for example, in the storage unit 208 onto the RAM 203 via the input/output interface 205 and the bus 204, and executes the program. Thus, the above-described series of processing is performed.

Programs to be executed by the computer (the CPU 201) are provided being recorded in the removable media 211 which is a packaged media or the like. Also, programs may be provided via a wired or wireless transmission medium, such as a local area network, the Internet or digital satellite broadcasting.

In the computer, by inserting the removable media 211 into the drive 210, the program can be installed in the storage unit 208 via the input/output interface 205. Further, the program can be received by the communication unit 209 via a wired or wireless transmission media and installed in the storage unit 208. Moreover, the program can be installed in advance in the ROM 202 or the storage unit 208.

It should be noted that the program executed by a computer may be a program that is processed in time series according to the sequence described in this specification or a program that is processed in parallel or at necessary timing such as upon calling.

It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1) An image processing apparatus including:
an edge detection part that detects an edge of a subject on an input image;
a luminance change determination part that determines whether a luminance value in a vicinity of the edge in the input image is increased or decreased in a predetermined direction; and
a contour supplement part that supplements a contour to the edge in the input image, the contour having the luminance value changed in a time direction depending on a result of the determination.

(2) The image processing apparatus according to (1), wherein the predetermined direction is orthogonal to the edge.

(3) The image processing apparatus according to (1) or (2), wherein the contour supplement part defines the luminance value of the contour such that the luminance value of the contour is increased or decreased from a predetermined luminance value in a first period and the luminance value of a contour is returned to the predetermined luminance value in a second period longer than the first period.

(4) The image processing apparatus according to (3), wherein the luminance change determination part determines change in the luminance value in the vicinity of the edge toward the predetermined direction for the edge within a first region on the input image, and determines change in the luminance value in the vicinity of the edge toward a direction opposite to the predetermined direction for the edge within a second region other than the first region on the input image.

(5) The image processing apparatus according to (4), wherein the contour supplement part defines the luminance value of the contour such that the first period for the contour supplemented to the edge within the first region is to be different in a time from the first period for the contour supplemented to the edge within the second region.

(6) The image processing apparatus according to any one of (1) to (5), further including an effect line adding part that adds an effect line to a region on a side opposite to the predetermined direction at the edge in the input image.

(7) The image processing apparatus according to (6), wherein the effect line adding part adds the effect line to the edge, the effect line having a pattern changed in the luminance value toward a direction opposite to the predetermined direction, and the pattern travelling to the opposite direction with time.

The present disclosure contains subject matter related to that disclosed in Japanese Priority Patent Application JP 2012-203963 filed in the Japan Patent Office on Sep. 18, 2012, the entire content of which is hereby incorporated by reference.

What is claimed is:

1. An image processing apparatus comprising:
an edge detection part that detects an edge of a subject depicted within an input image;
a luminance change determination part that determines whether a luminance value in a vicinity of the edge in the input image is increased or decreased in a predetermined direction from the edge; and
a contour supplement part that supplements a contour to the edge in the input image, the contour having the luminance value changed over a period of time depending on a result of the determination,
wherein the edge detection part, the luminance change determination part, and the contour supplement part are each implemented via at least one processor.

2. The image processing apparatus according to claim 1, wherein the predetermined direction is orthogonal to the edge.

3. The image processing apparatus according to claim 2, wherein the contour supplement part defines the luminance value of the contour such that the luminance value of the contour is increased or decreased from a predetermined luminance value in a first period of time and the luminance value of the contour is returned to the predetermined luminance value in a second period of time longer than the first period of time.

4. The image processing apparatus according to claim 3, wherein the luminance change determination part determines change in the luminance value in the vicinity of the edge toward a first region on the input image that is located in the predetermined direction from the edge, and determines change in the luminance value in the vicinity of the edge toward a second region other than the first region on the input image that is located in a direction from the edge that is opposite to the predetermined direction.

5. The image processing apparatus according to claim 4, wherein the contour supplement part defines the luminance value of the contour such that, in the first period of time, the luminance value in the vicinity of the edge towards the first region is different than the luminance value in the vicinity of the edge towards the second region.

6. The image processing apparatus according to claim 5, further comprising an effect line adding part that adds an effect line to a region on a side opposite to the predetermined direction at the edge in the input image, wherein the effect line adding part is implemented via at least one processor.

7. The image processing apparatus according to claim 6, wherein the effect line adding part adds the effect line to the edge, the effect line having a pattern changed in the luminance value toward a direction opposite to the predetermined direction, and the pattern travelling to the opposite direction with time.

8. An image processing method comprising:
detecting an edge of a subject depicted within an input image;
determining whether a luminance value in a vicinity of the edge in the input image is increased or decreased in a predetermined direction from the edge; and
supplementing a contour to the edge in the input image, the contour having the luminance value changed over a period of time depending on a result of the determination.

9. A non-transitory computer-readable medium having embodied thereon a program, which when executed by a computer causes the computer to execute a method, the method comprising:
    detecting an edge of a subject depicted within an input image;
    determining whether a luminance value in a vicinity of the edge in the input image is increased or decreased in a predetermined direction from the edge; and
    supplementing a contour to the edge in the input image, the contour having the luminance value changed over a period of time depending on a result of the determination.

\* \* \* \* \*